(12) United States Patent
Telford et al.

(10) Patent No.: US 11,548,576 B2
(45) Date of Patent: Jan. 10, 2023

(54) TRACKED VEHICLE

(71) Applicant: Polaris Industries Inc., Medina, MN (US)

(72) Inventors: Cody Telford, Sandpoint, ID (US); Phillip Driggars, Sandpoint, ID (US)

(73) Assignee: Polaris Industries Inc., Medina, MN (US)

( * ) Notice: Subject to any disclaimer, the term of this patent is extended or adjusted under 35 U.S.C. 154(b) by 1094 days.

(21) Appl. No.: 16/189,223

(22) Filed: Nov. 13, 2018

(65) Prior Publication Data

US 2020/0148291 A1    May 14, 2020

(51) Int. Cl.
| | |
|---|---|
| *B62D 55/108* | (2006.01) |
| *B62D 55/116* | (2006.01) |
| *B62D 55/02* | (2006.01) |
| *B62D 21/18* | (2006.01) |
| *B62D 21/15* | (2006.01) |

(52) U.S. Cl.
CPC .......... *B62D 55/108* (2013.01); *B62D 21/15* (2013.01); *B62D 21/183* (2013.01); *B62D 55/02* (2013.01); *B62D 55/116* (2013.01)

(58) Field of Classification Search
CPC ............... B62D 55/104; B62D 55/108; B62D 55/1083; B62D 55/116; B62D 21/183; B62D 21/155
See application file for complete search history.

(56) References Cited

U.S. PATENT DOCUMENTS

| | | | |
|---|---|---|---|
| 4,768,794 | A | 9/1988 | Bibollet |
| 5,474,146 | A | 12/1995 | Yoshioka et al. |
| 6,926,108 | B1 | 8/2005 | Polakowski et al. |
| 7,594,557 | B2 | 9/2009 | Polakowski et al. |
| 8,910,738 | B2 | 12/2014 | Mangum |
| 9,346,518 | B2 | 5/2016 | Polakowski et al. |
| 2005/0183899 | A1 | 8/2005 | Polakowski et al. |
| 2006/0180370 | A1 | 8/2006 | Polakowski et al. |
| 2009/0294197 | A1 | 12/2009 | Polakowski et al. |
| 2013/0285339 | A1 | 10/2013 | Bedard et al. |
| 2015/0034404 | A1 | 2/2015 | Polakowski et al. |
| 2016/0251043 | A1 | 9/2016 | Muehlfeld et al. |
| 2017/0057573 | A1 | 3/2017 | Gentry |
| 2018/0257690 | A1 | 9/2018 | Mangum et al. |
| 2018/0273142 | A1 | 9/2018 | Mangum et al. |

FOREIGN PATENT DOCUMENTS

| | | |
|---|---|---|
| CA | 2441643 A1 | 4/2004 |
| CA | 2584119 A1 | 10/2007 |
| WO | 201517514 A2 | 2/2015 |
| WO | 2017079503 A1 | 5/2017 |

OTHER PUBLICATIONS

Office Action dated Sep. 15, 2021 in Canadian Application No. 3061397.
Office Action dated May 9, 2022 in Canadian Application No. 3061397.

*Primary Examiner* — Jason R Bellinger
(74) *Attorney, Agent, or Firm* — Harness, Dickey & Pierce, P.L.C.

(57) ABSTRACT

A vehicle is disclosed that includes various portions for carrying a rider and operation of the vehicle. The vehicle may be configured for operation of more than one surface or surface type. The vehicle has a selected suspension assembly for operation of various surface types.

23 Claims, 17 Drawing Sheets

TRACKED VEHICLE

FIELD

The present disclosure relates to a vehicle, and particularly to a tracked or convertible vehicle.

BACKGROUND

This section provides background information related to the present disclosure which is not necessarily prior art.

Vehicles, according to various embodiments, generally include an engine that may be powered with a selected power system to drive a drive system, such as through a transmission. Various vehicles may include those that have wheels to be rotated by the engine or a track. Generally, the vehicle is provided in a manner to allow for operation of the vehicle on a selected surface. Generally, vehicles may be designed to operate on limited surfaces. However, various mechanisms may be provided to alter or be attached to a portion of a vehicle to allow it to be operated on more than one or limited surfaces. Such systems include the Timbersled® suspension and conversion system sold by Polaris Industries, Inc., having a place of business in Minnesota.

SUMMARY

This section provides a general summary of the disclosure, and is not a comprehensive disclosure of its full scope or all of its features.

A vehicle may be operated by a user or rider and generally includes a frame that holds an engine. The frame may include various components such as an engine mount, a fender, a seat mount, and the like. As discussed further herein various embodiments of the vehicle may include operational controls and suspension components.

In various embodiments, a vehicle may be converted from a first type of vehicle to a second type of vehicle. For example, a road or dirt motorcycle may be converted, such as by removing at least one wheel, such as the driven wheel, and replacing it with a chassis and track assembly. The track may be driven by the engine, such as with a drive chain. The track chassis assembly may include a suspension assembly that is integrated or connects various portions of the track chassis assembly relative to the vehicle frame. In various embodiments, the track chassis assembly includes a track frame that is connected to the vehicle frame once the driven wheel is removed.

The track chassis may include a suspension system that includes one or more shock absorbers and/or springs, in combination with a single elongated torque arm assembly. The single torque arm assembly may include two torque arm portions, also referred to as extensions, on opposed sides (i.e. left side and right side) of the track chassis assembly. The one or more shock absorbers and/or springs may be positioned between the first and second torque arm portions. The single torque arm assembly generally includes a first forward or upper torque arm connection and a second rearward or lower torque arm connection. The first forward torque arm connection is near a fist end at a top portion of the chassis and the second rearward torque arm connection is near a second end and the bottom portion of the chassis. The bottom chassis portion may also be referred to as a skid. The torque arms extend between the two connections. Accordingly, the single torque arm assembly may provide interconnection between the skid and the upper part of the chassis alone with the one or more shock absorbers.

The suspension assembly may further include a single shock absorber in combination with one or more limiter straps. The limiter straps may be used to limit an amount of rotation of the skid relative to an upper portion of the chassis and/or the frame of the vehicle without providing dampening or ride height to the chassis assembly. The straps may be formed of a selected flexible material that may flex or compress under a selected load.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
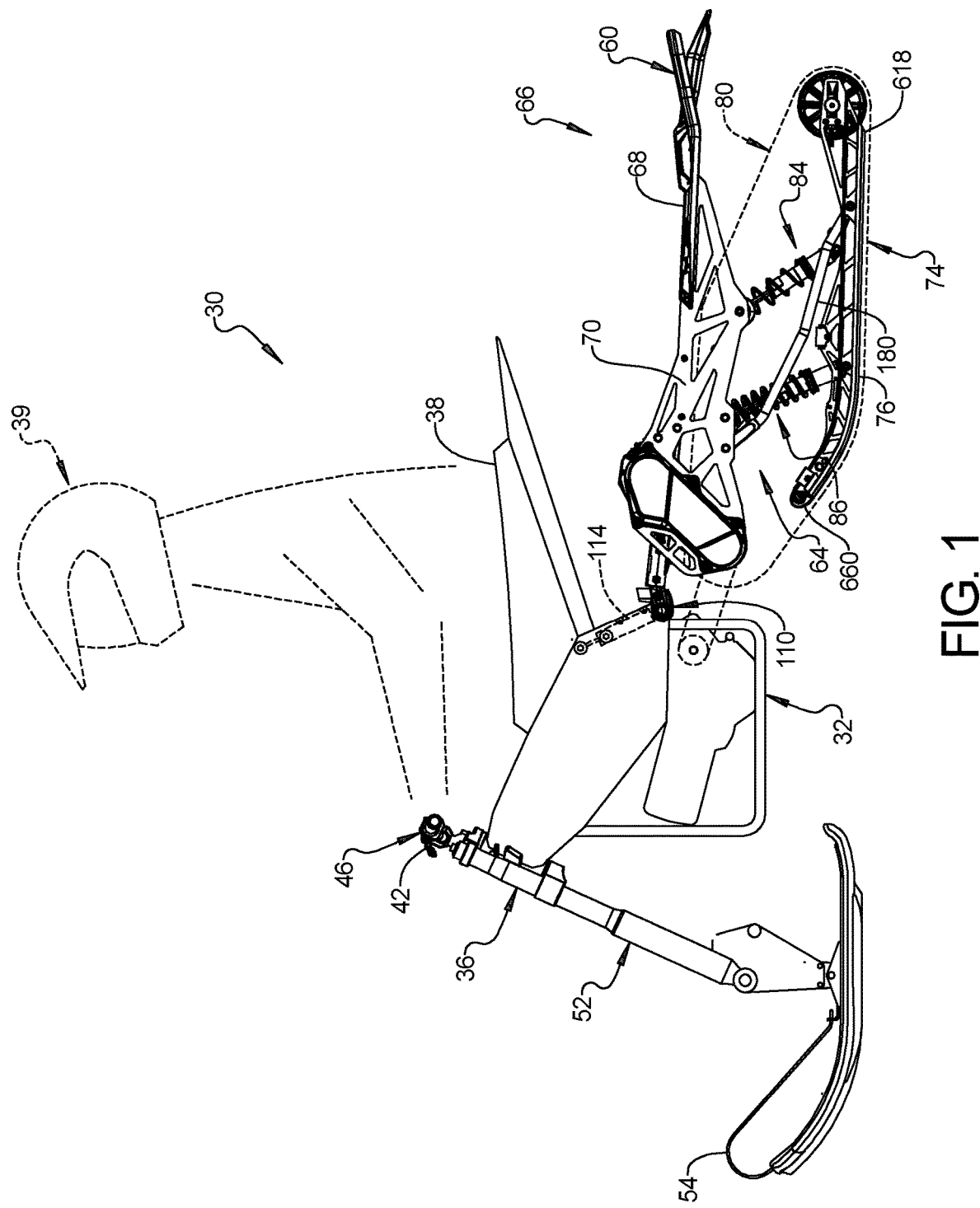
FIG. 1 is an environmental view of a vehicle having a track chassis assembly, according to various embodiments.
Figure 2:
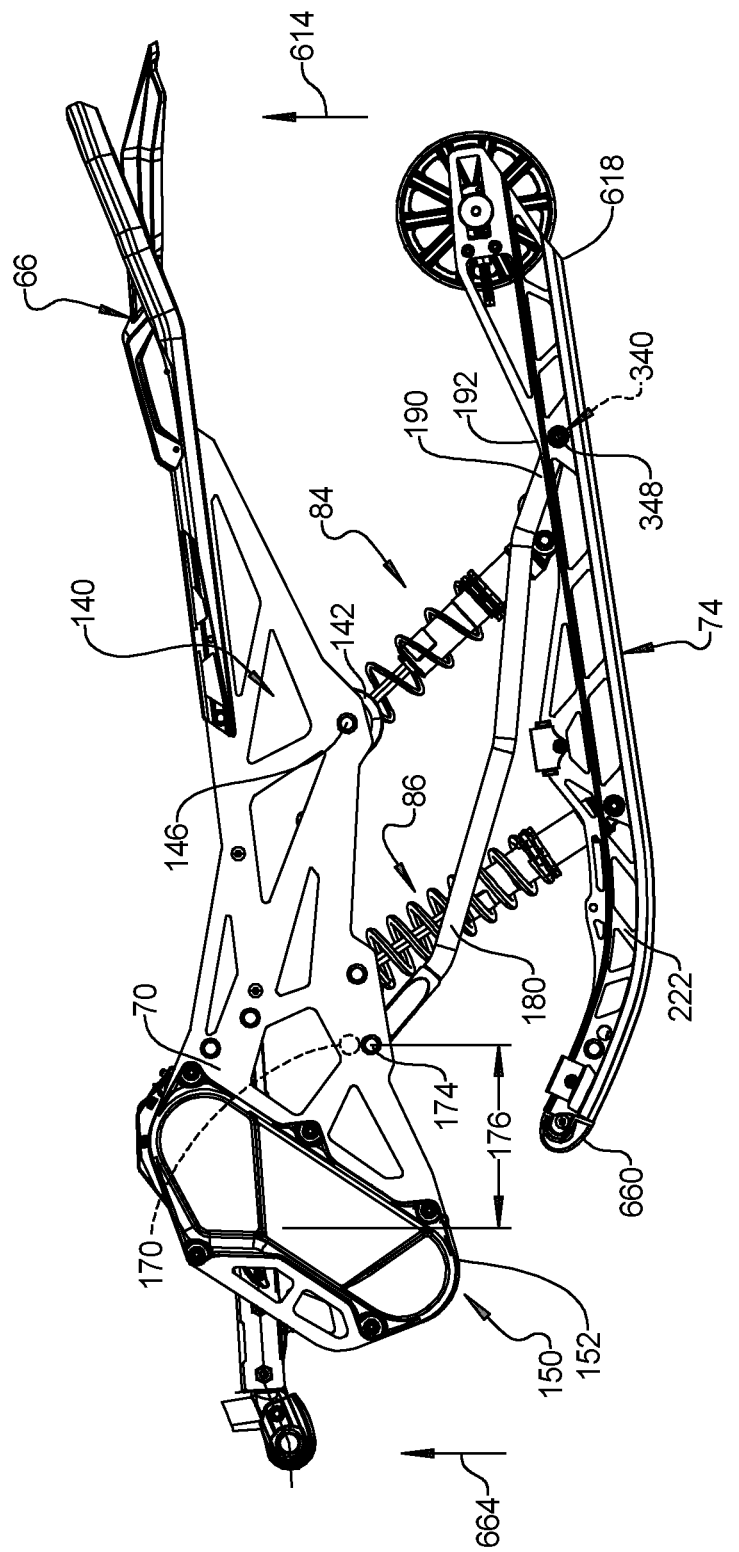
FIG. 2 is a left side plan view of the track chassis assembly of FIG. 1.

Example embodiments will now be described more fully with reference to the accompanying drawings.

A vehicle 30, with reference to FIG. 1 to FIG. 9, includes various portions such as an engine 32 that is fixed to a frame 36. The frame 36 may support a seat 38 on which a rider or user 39 may sit when operating the vehicle 30. The operator 39 may operate the vehicle with various controls, such as with hand controls 42 mounted to a handlebar 46. The handlebar 46 may be connected to a front assembly 52 that may include various portions, such as a front shock system or suspension system, and the like.

Generally, the vehicle 30 may be used or operated on snow or soft material and therefore may include a front ski 54 that is mounted to the front assembly 52 and may be turned with the handlebar 46 by the rider 39. The vehicle 30 may be turned or steered by moving the handlebar 46 and/or leaning the vehicle 30, such as by a rider 39 shifting the rider's weight. The vehicle 30 may also include other generally known components, such as foot controls, an exhaust system, fuel system, and the like. One skilled in the art will understand that the vehicle 30 may include additional components that are not described in detail herein.

Attached to the frame 36 may be a track chassis or frame assembly 60 that includes various components, such as a suspension assembly 64, an upper frame assembly (also referred to as an upper portion or member) 66 that may include a top 68 and one or more side frame or chassis portions 70, 72. In various embodiments the top portion 68 and the side portions 70, 72 may form or define a tunnel. It is further understood that additional components may be added, such as plastic accessories or covers, to the upper frame assembly 66. Further, the track chassis 60 may include a rail or pair of rails assembly 74. The rail assembly 74 may also be referred to as a skid assembly and may include a first skid rail 222 and a second skid rail 226 that includes a bottom or skid surface 76 on which a track 80 may slide against and the vehicle 30 may be propelled thereby.

Figure 9:
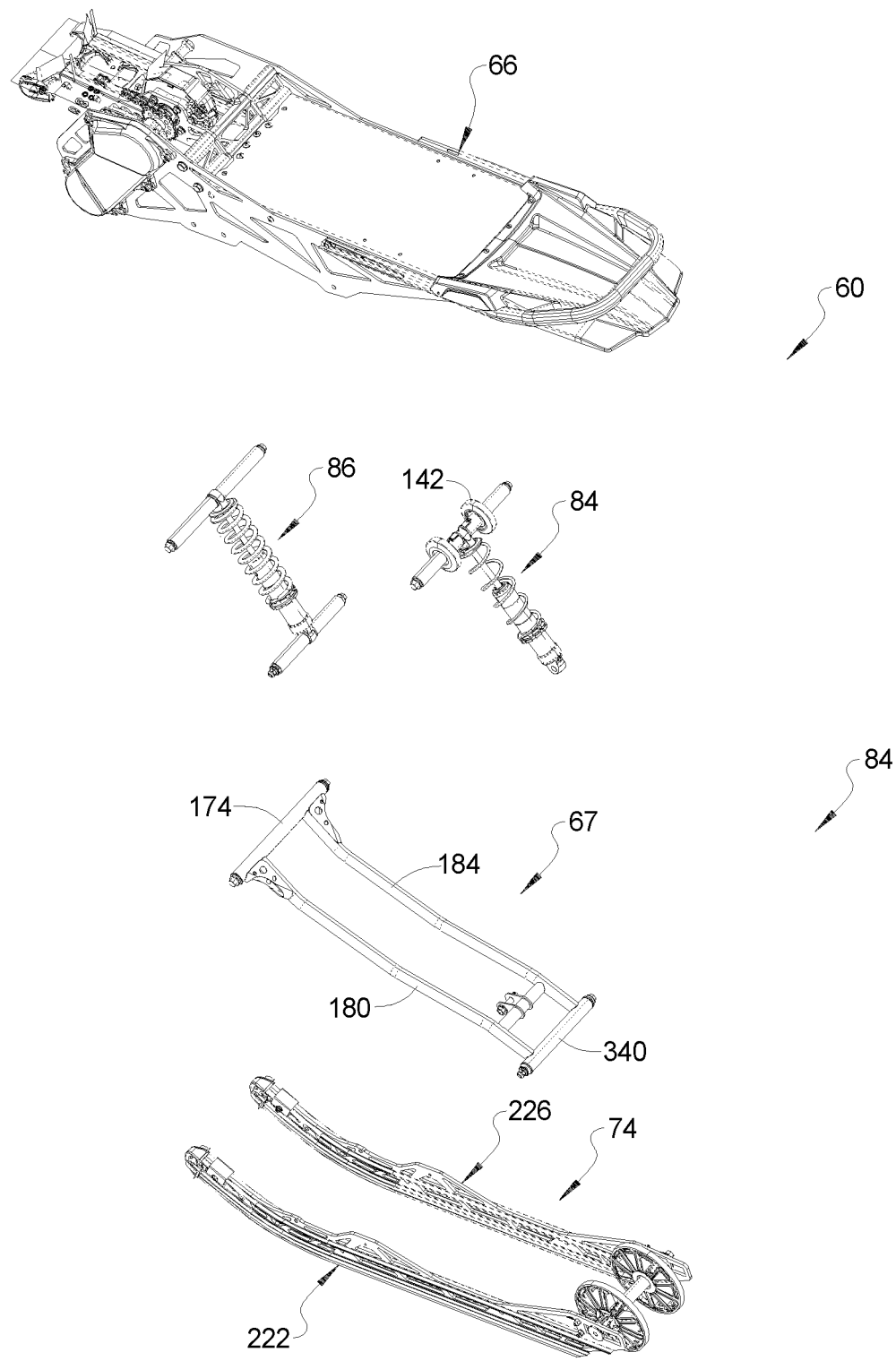
FIG. 9 is a top exploded view of the track chassis assembly of FIG. 1.

As discussed further herein, the suspension assembly 64 may include one or more shock assemblies, such as a first or rearward shock assembly 84 and a forward or second shock assembly 86. The shock assemblies, according to various embodiments, may include various configurations, as discussed herein, which may include a damper and spring or only a damping portion. In addition, as illustrated in FIG. 9, the suspension assembly 64 may include a single torque arm assembly 67 that includes a first extension tube (which may also be referred to as a first torque or control arm) 180 and a second extension tube (which may also be referred to as a second torque or control arm) 184, as discussed further herein. In various embodiments, the first torque arm 180 may be a left torque arm and the second torque arm 184 may be a right torque arm. The torque arm assembly 67 may extend between a first or upper pivot tube (which may also be referred to as a connection portions or member) 174 and a second or lower pivot tube (which may also be referred to as a connection portions or member) 340, as discussed further herein. The single torque arm 67 may be formed as one member and/or formed of separate portions that are fixed together, such as by welding.

The track chassis or frame assembly 60, with continuing reference to FIG. 1 through FIG. 9, will be discussed in greater detail. The track chassis 60 may connect with the frame 56 in a selected manner, such as at the pivot arm or swing arm connection 110 upon removal of a swing arm from a two wheel motorcycle assembly. The swing arm connection 110 may be used by the track chassis 60 to connect to the frame 36 in an efficient manner. In various embodiments, a swing arm suspension portion, such as a shock absorber 114 may interconnect the track chassis 60 with the frame 36 in addition to the connection at the swing arm connection 110.

As discussed above, however, the track chassis 60 further includes the suspension assembly 64, as discussed further herein. The track chassis assembly 60 may include various features, such as a rearward or rear most track carrier wheel or wheel assembly 120. The rear track carrier assembly 120 may be rotatably mounted on a spindle or axle 124 between two mounting points or a mounting point 128 with the skid assembly 74. The track 80 may contact or be operated to move along the skid assembly 74 and over the track carrier assembly 120, such as on track carrier wheels 132 held to the axle 124.

The track 80 may further move and pas s over a set of upper or spaced apart from the skid assembly 74 carrier wheel 140. The upper carrier wheel assembly 140 may include one or more carrier wheels 142 that are mounted to a crossbar or shock mount bar 146. The crossbar or shock mount bar 146 may be mounted to the chassis portion 68, such as extending between chassis frame portions such as a first or left chassis frame portion 70 and a second or right hand chassis frame portion 72. Each of the chassis frame portions 70, 72 may be opposite sides of the upper or top portion 68.

The track may further extend over, such as from the upper carrier assembly 140, a drive assembly or drive shaft 150. The drive shaft assembly 150 may include one or more drive wheels 152 that are powered from the engine 32. The drive wheels 152 generally rotated around a drive axis 153 which may also be a drive axle. The engine 32 may power the drive assembly 150 by a chain or drive connection to a first or primary drive assembly 158 and a second chain or drive portion may drive a second drive gear 164 by the drive chain or drive member 160. Accordingly, the forward drive assembly 150 may be driven or powered by the engine 32 to drive the drive assembly 150 to rotate or drive the track 80.

Further, the track 80 may be guided or held relative to the track chassis 60 by one or more track guides 170 that may be mounted to a forward or torque arm connection bar or member 174. The forward torque arm connection bar 174 may extend between the two frame members 70, 72 at a selected location, such as rearward or a selected distance from the drive assembly 150, such as a selected distance 176. The connection bar 174 may be connected to the frame members 70, 72 with appropriate connection members, such as bolts or nuts and may include a first connection member 175 and a second connection member 179.

The forward torque connection member 174 may extend to be fixed to the frame member 70, 72 and connect to a forward end of the single torque arm assembly including the first torque arm 180, which also may be a left torque arm, and the second torque arm 184 which may also be referred to a right torque arm. Each of the two torque arms 180, 184 extend from respective forward ends 186, 188 that are mounted or connected to the front crossbar 174 to rear or back respective ends 190, 192. Accordingly, the track chassis assembly 60 may include the two torque arms 180, 184 that extend from a forward or near a forward end 660 of the skid assembly 74 toward a rear end 618 near a rear of the skid assembly 74. Forward and rearward are understood to be generally a direction relative to the handlebars or the ski being forward on the vehicle 30. Forward and rearward, however, are not intended to be limiting and are for reference herein.

As illustrated in FIG. 1 through FIG. 9, the track chassis assembly 60 may include the rearward shock assembly 84 and the forward shock assembly 86. The chassis assembly may include the forward shock assembly 86 connected to a first crossbar or connection bar 200 that extends between the two members 70, 72. Various connection features may be used to connect the crossbar 200 to the members 70, 72 such as one or more bolts 204, 206. The crossbar 200 may rotate relative to the frame members 70, 72 and/or the shock assembly 86 may include an upper or first connection 210 that may rotate relative to the bar. The shock assembly 86 may include various portions such as a coil over spring configuration including an internal damper portion 212 and an external spring 216. The internal damper portion 212 may include a shock or rod arm that terminates in the connection 210 to the crossbar 204.

The shock assembly 86 is connected at a second end or second connection 214 to a second crossbar or connection member 218. The second crossbar or connection bar 218 is fixed to the side rails or skid rails of the skid assembly 74, including a first side or skid rail 222 and a second side or skid rail 226. The cross or connection member 218 may also be fixed with selected fixation or connection portions, such as a first bolt 228 and a second bolt 292. The cross or fixation member 218 may therefore rotate relative to the side rails or skid rails 222, 226 and/or the connection 214 of the shock assembly 86 may rotate relative to the crossbar 218. In this way, as the suspension assembly 64 of the track chassis 60 operates, the shock assembly 86 may move relative to the top or upper 68 and the skid assembly 74. In various embodiments, for example, the interconnection 214 may rotate relative to the connection bar 218 to allow the top connection bar 200 to move toward the frame 36 of the vehicle assembly 30, such as including the engine 32.

The second or rearward shock assembly 84 is connected to the cross or fixation member 146 which may also include the track guides 142, as discussed above. The track guides 142 may rotate relative to the fixation bar or member 146 and/or may be fixed and be formed of a selected bearing material to guide the track 80, as is generally understood in the art. Nevertheless, the shock assembly 86 may include a first connection portion or feature 302 that connects to the crossbar 146. As discussed above, the crossbar 146 may be fixed to the frame members 70, 72 with various connection features such as one or more bolts or connection members 306, 310. The crossbar 146 may rotate relative to the frame members 70, 72 and/or the shock connection 302 may rotate relative to the crossbar 146, similar to the connection of the forward shock assembly 86 to the crossbar 200. Therefore the shock assembly 84 may move relative to the crossbar 146.

The rearward shock assembly 84 includes a second connection 320 to a second crossbar or connection mount 324. The second connection bar 324 extends between the torque arms 180, 184. The connection bar or mount point 324 may be fixed to the torque arms 180, 184 in a selected manner, such as with welding, rivets, bolts, or the like. The second connection 320 may connect directly to the crossbar 324 and/or be connected to mounts or fixation s 326. The exact position of the end connection 320 relative to the crossbar 324 may be selected for various purposes, such as achieving a selected geometry or lengths of the shock assembly 84. Nevertheless, the second connection 320 is connected to the torque arms 180, 184, such that the shock assembly 84 operates in concert with the torque arms 180, 184. The forward shock assembly 86, however, is not directly connected to the torque arms 180, 184 and therefore moves or is able to move independently of the torque arms 180, 184.

In light of the above, the rearward shock assembly 84 may operate with the torque arms 180, 184 and the forward shock assembly 86 may operate at least partially independently thereof. The rearward shock assembly 84 may include features similar to the forward shock assembly 86, such as a coil over design including an internal damper or shock absorbing member 330 and an external or coil over spring 334. The forward shock assembly 86 and the rearward shock assembly 84 may be included to have a same or different length, stroke, etc.

As discussed above the torque arms 180, 184 extend from opposite sides or along opposite sides of the chassis assembly 60. The torque arms 180, 184 extend from the front connection member or crossbar 174 that extends between the two frame members 70, 72 to a second or rearward connection cross member 340. The second connection cross member 340 may extend between the skid rails or walls 222, 226. The cross member 340 may be connected to the respective skid rails 222, 226 with an appropriate connection member, such as with bolts or nuts 344, 348.

The second cross member 340 is mounted to the torque arms 180, 184 at the torque arm second ends 190, 192 to allow the torque arms to rotate relative to the skid assembly 74. Similarly, the forward or first connection block 174 allows the torque arms 180, 184 to rotate or move relative to the top or top member 66 of the chassis assembly 60. Accordingly, during operation of the suspension assembly 64 the torque arms 180, 184 may move relative to the skid assembly 74 and/or top assembly 66 from a position as illustrated in FIGS. 1-8 to a configuration where at least part of the skid assembly 74 is near the top portion 66 and/or the torque arms 180, 184 are near the skid assembly 74 and/or near the top member or top place 66.

As is understood by one skilled in the art, the rider 39 may operate the vehicle 30 over a selected surface. The suspension assembly 64 may allow one or more ends of the chassis assembly 60 to move relative to one another. For example, if the forward end 660 engages a bump or other obstruction the forward end 660 may move toward the upper portion 66 generally in the direction of arrow 664. The suspension assembly 64, including the shock members 84, 86 may compress a selected amount and the skid assembly 74 may rotate or move relative to the top 66 while being constrained, at least in part, by the interconnection of the torque arms 180, 184 between the frame members 70, 72 and the skid assembly 74. In a different situation, an obstruction or force may be applied to the rearward portion 618 of the skid assembly 74 causing the skid assembly 74 to move generally in the direction of arrow 614 toward the top member 66. The shock absorbing assemblies 84, 86 may again compress a selected amount and in a selected manner and the torque arms 180, 184, either alone or in combination with the shock absorber member 84, 86, may cause or direct movement of the skid assembly 74 relative to the top 66.

The movement of the skid assembly 74 relative to the top 66 may be controlled by the position of mounting points of the shock members 84, 86. Further interconnections of the torque arms 180, 184 may also control and limit movement of the skid assembly 74 relative to the top 66. As illustrated in FIG. 1-FIG. 8, each of the shock absorber assemblies 84, 86 are connected to different portions of the chassis assembly as are the torque arms 180, 184. In various embodiments, the chassis assembly 64 may have or define a track length 389. The track length 389 may be about 100 cm to about 300 cm, including about 152 cm to about 200 cm.

Figure 3:
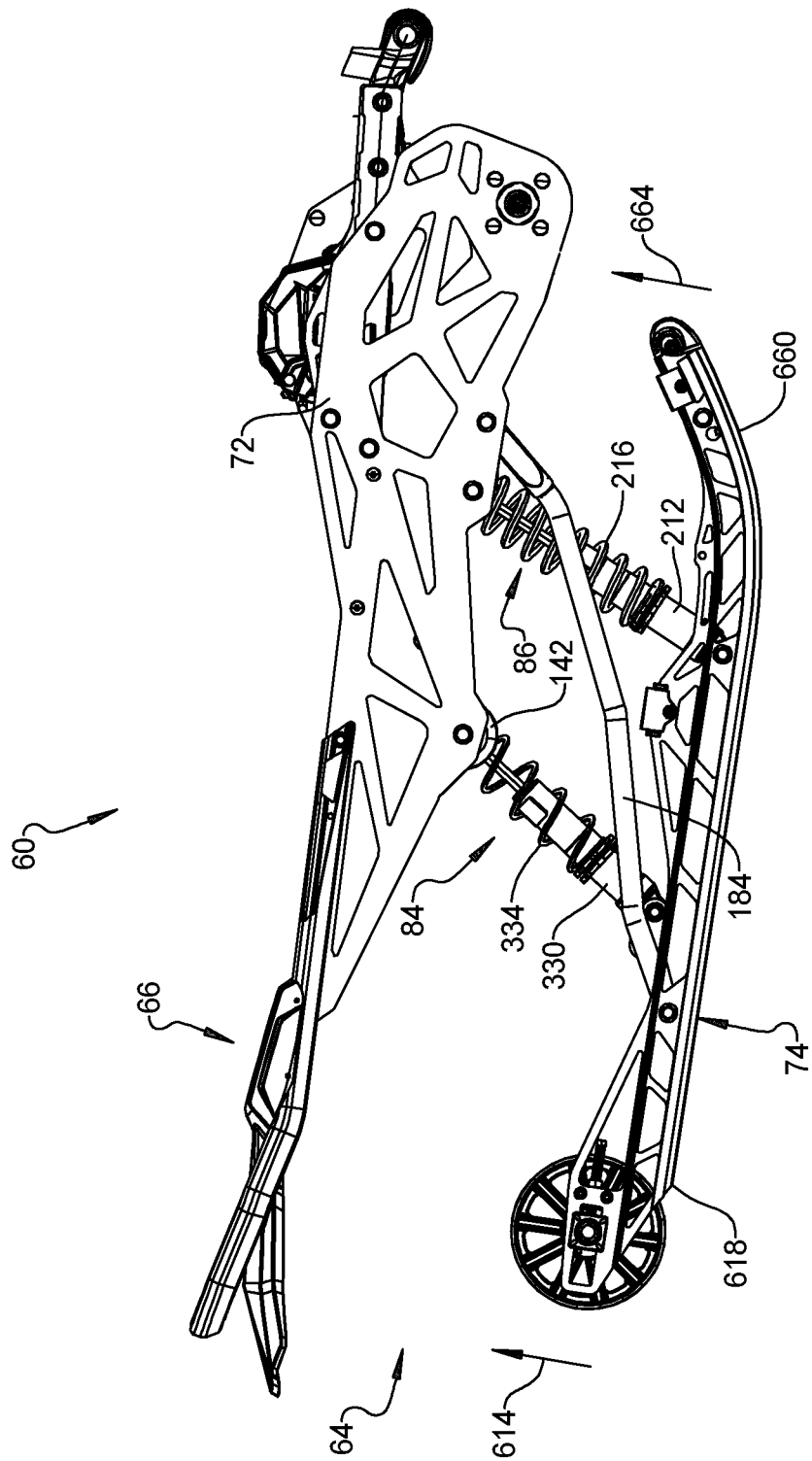
FIG. 3 is a right side plan view of the track chassis assembly of FIG. 1.
Figure 4:
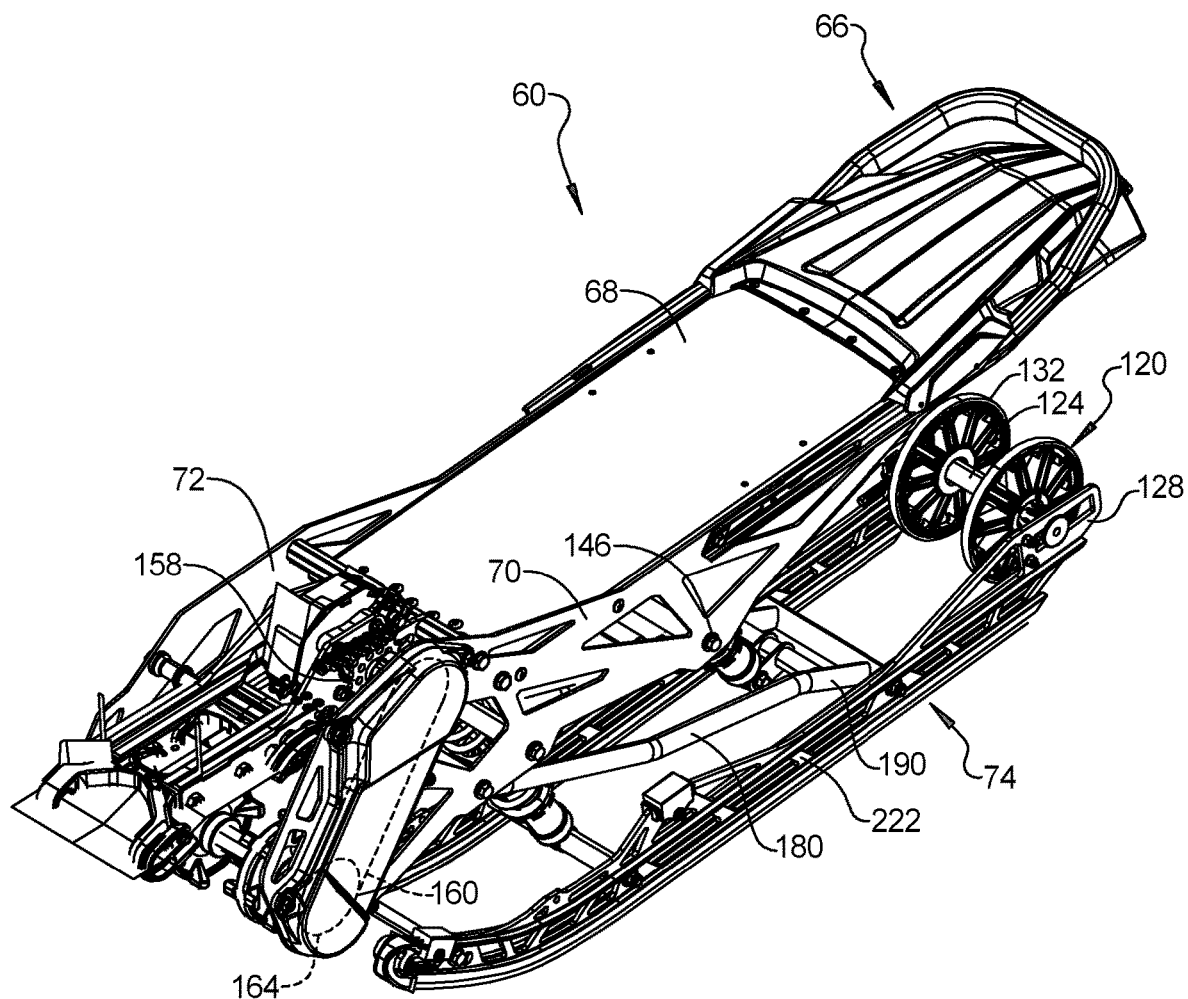
FIG. 4 is a top perspective view of the track chassis assembly of FIG. 1.
Figure 5:
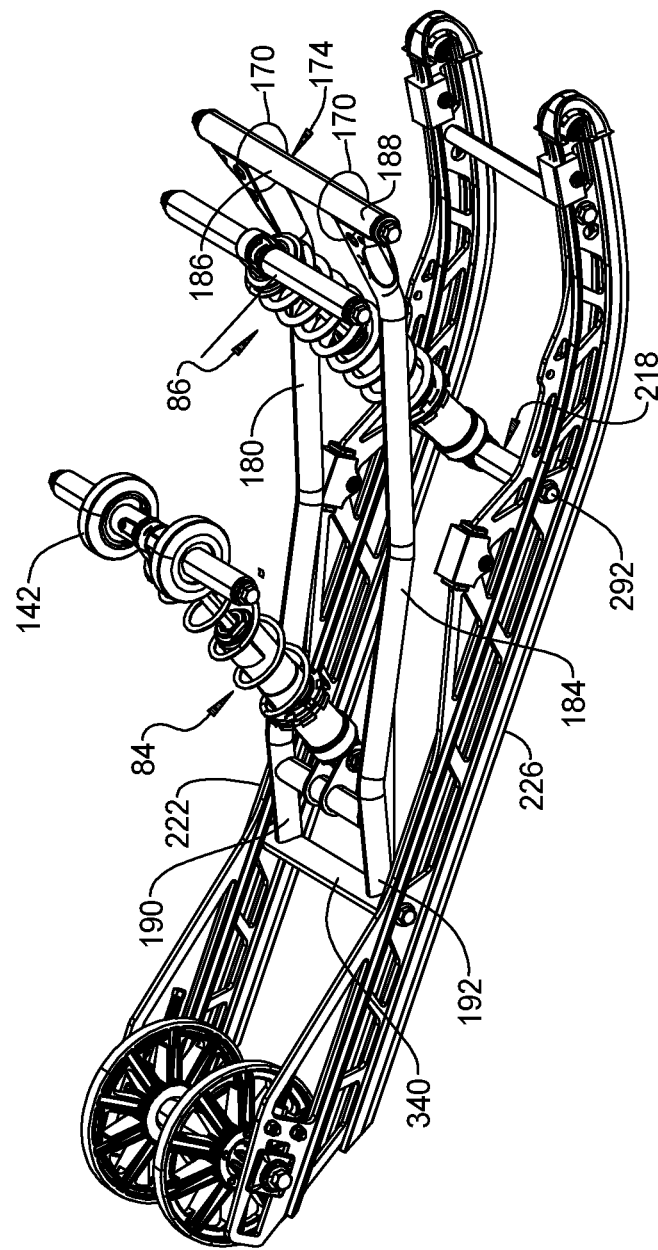
FIG. 5 is a top perspective detail view of a suspension assembly of the track chassis assembly of FIG. 1.
Figure 6:
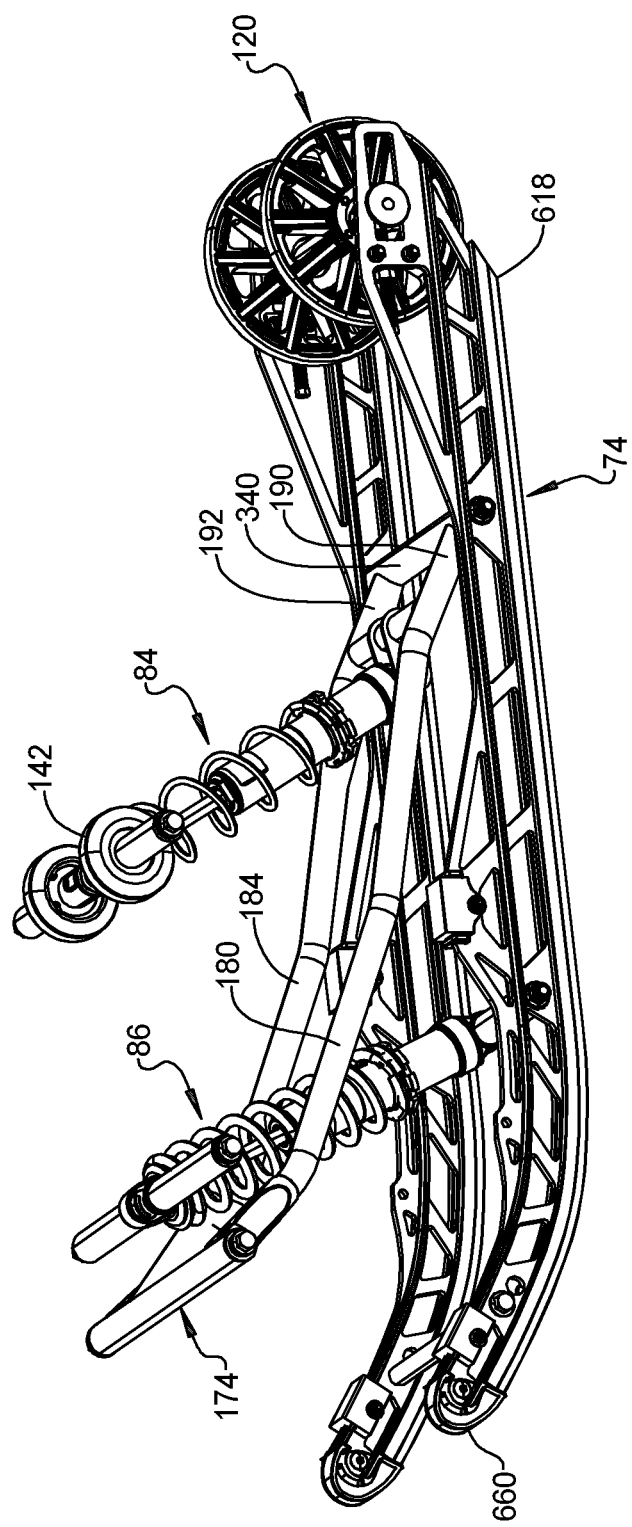
FIG. 6 is a left top perspective view of the suspension assembly included in the track chassis assembly of FIG. 1.
Figure 7:
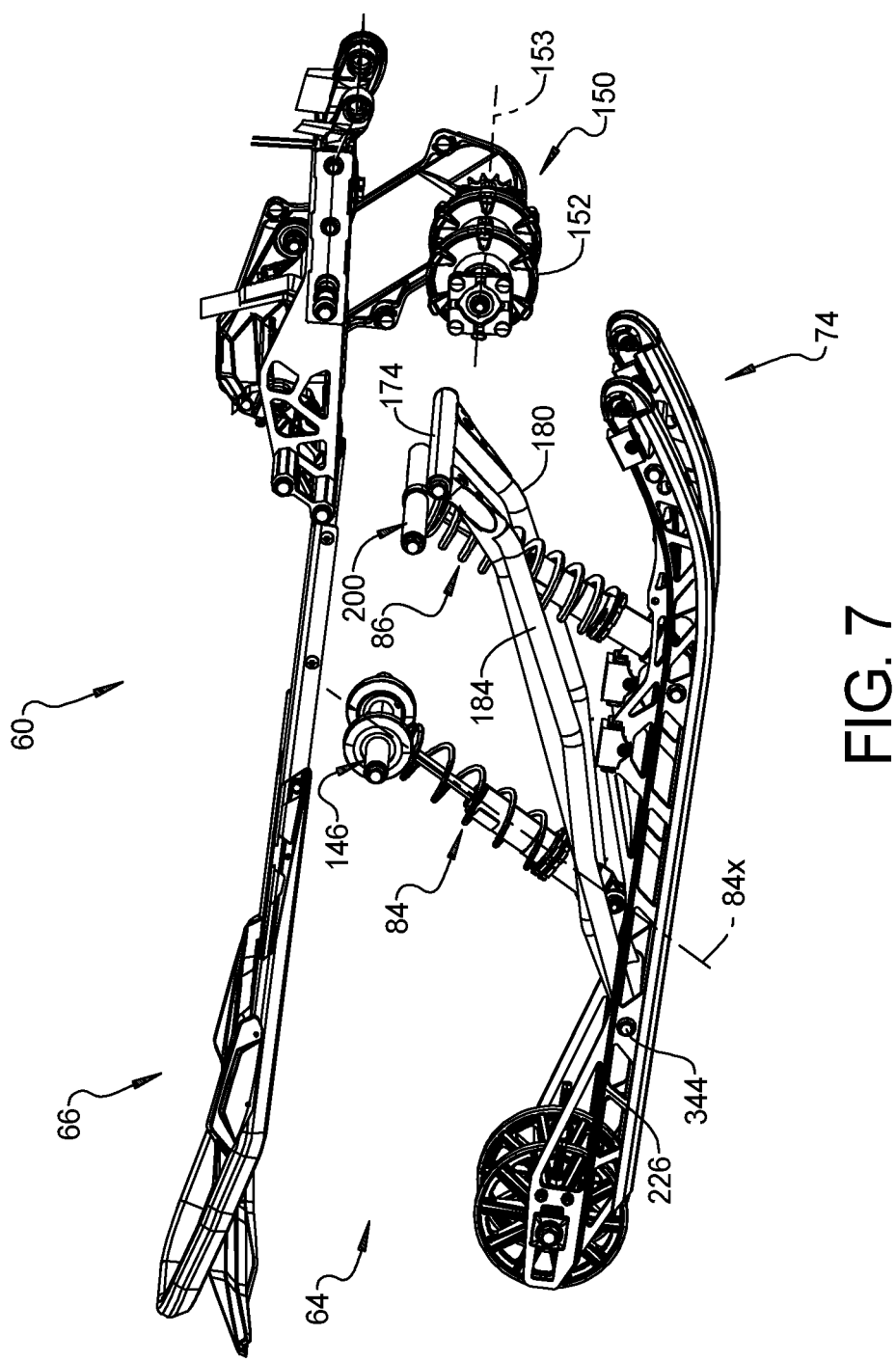
FIG. 7 is a side perspective view of the track chassis assembly and top member of the track chassis assembly illustrated in FIG. 1.
Figure 8:
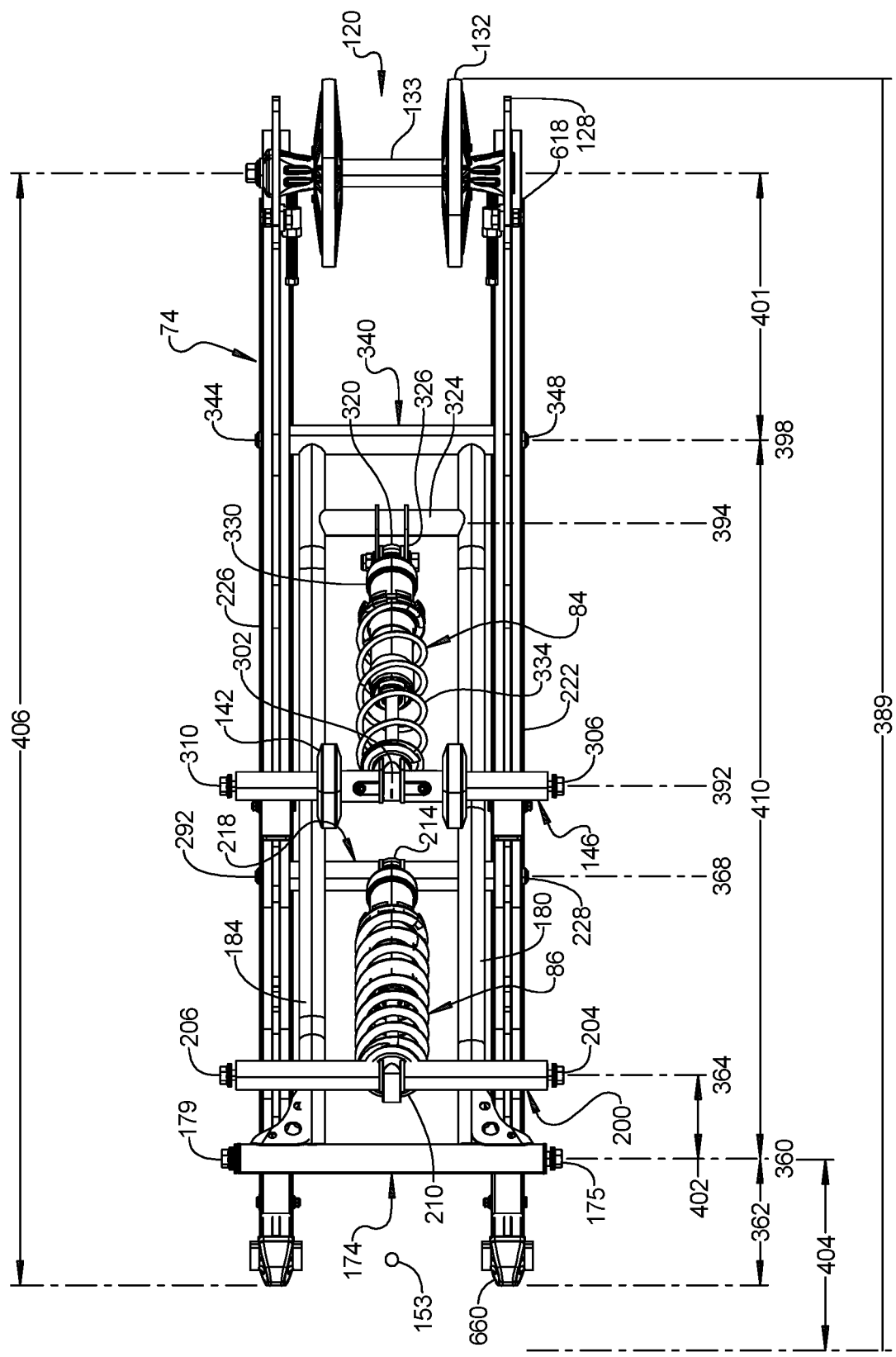
FIG. 8 is a top plan view of a suspension assembly included in the track chassis assembly of FIG. 1.

The forward torque arm connection member 174 is the most forward mounted connection of the suspension assembly 64. As illustrated in FIG. 3 and FIG. 8 the forward torque arm connection is mounted at a first position or forward position 360. The mounting member 174 is a distance 362 from the forward end or portion 660 of the skid assembly 74 in the fully extended position of the suspension assembly. The distance 362 is about 8 cm to about 40 cm, including about 8 cm to about 20 cm. The forward shock assembly 86 is mounted to the forward connection member 200 at a second position 364. The second or lower end 214 of the forward shock assembly 86 is mounted at a second position 368. The rearward shock assembly 84 is mounted at a forward position 392 to the forward connection member 146 and mounted to the torque arms at a second position 394. The torque arms or extensions 180, 184 are connected to the lower pivot 340. The lower pivot 340 is mounted at a position 398. The position may be forward of the end of the skid 618 and/or the axle 133 of the rear carrier wheels 132. The rear torque arm connection position 398 is a distance 401 in bound or forward of the rear carrier wheel axle 133 of the skid assembly 74. The distance 401 may be about 10 cm to about 80 cm, including about 20 cm to about 50 cm.

The shock mounting positions 364, 388, 392, and 394 are, therefore, positioned within the length or dimensions of the torque arm connection areas 360 and 398. The shock assemblies 84, 86, therefore, are mounted within the volume or positioned between the connection points of the torque arms 180, 184. Therefore, movement of the skid assembly 74 relative to the top member 66 may be controlled and/or managed at least by the torque arm assembly 67 including the torque arms or extensions 180, 184.

Further, the forward torque arm connection position 360 is mounted forward of the first or forward connection position 364 of the forward shock assembly 86. The forward torque arm mounting position 360 may be a selected dimension 402 forward of the mounting position 364 of the forward shock assembly 86. The dimension 402 may be an appropriate dimension be based upon an overall dimension, such as a length 406 of the skid assembly 74. The distance 406 may be about 80 cm to about 200 cm, including about 106 cm to about 135 cm. Nevertheless, the dimension 402 may be about 2 centimeters (cm) to about 36 cm, further including about 6 cm to about 8 cm. The forward torque arm mounting position 360 may be a selected distance 404 rearward of the drive axle axis 153. The distance 404 may be about 5 cm to about 50 cm, including about 10 cm to about 30 cm.

Further the forward mounting position 360 and the rearward mounting position 398 of the torque arms 180, 184 may be a selected dimension apart 410 such as about 30 cm to about 80 cm, including about 60 cm to about 70 cm. Again the dimension 410 between the connection positions 360, 398 of the torque arms 180, 184 may be based upon selected dimensions, such as the dimension 406 of the skid assembly 74.

The torque arms 180, 184, therefore, may limit or control movement of the skid assembly 74 relative to the top member 66 during operation of the vehicle 30 over selected uneven terrains and/or movement of the vehicle 30 by the operator 39. The shock assemblies 84, 86 interconnected with the chassis assembly 60 may also assist in achieving selected types of motion of the skid assembly 74 relative to the top member 66. As discussed above, the forward shock assembly 86 is interconnected between the frame members 70, 72 and between the skid assembly frame members 222, 226. The forward shock assembly 86, therefore, is not connected directly to the torque arms 180, 184. The rearward shock assembly 84, however, includes the second interconnection 320 that is connected to the connection cross member 324 that is connected directly to the torque arms 180, 184. Accordingly, movement of the torque arms 180, 184 is directly related to the movement of the rearward track assembly 84.

Generally, the torque arm assembly 67 may be used an positioned to determine leverage applied to the one or more shock assemblies, as discussed herein. The single forward or upper connection 174 and the single lower or rearward connection 340 of the torque arm assembly 67 alter movement of the chassis assembly. The specific location that the torque arm assembly 67 mounts to the chassis can be adjusted to change the ride characteristic of the skid 74 and/or vehicle 30. Further, the mounting location of the one or more shock assemblies relative to the mounting location of the torque arm 67 and/or on the torque arm 67 may alter how much leverage the torque arm 67 has on the shock. This will directly affect the ride characteristics of the vehicle 30. Thus, adjusting the locations can alter suspension geometry and ride characteristics.

In various embodiments, the forward connection point 360 may be in about a forward one-fifth to one-third of the chassis, including the skid 74. The rearward connection point 398 is generally within a rearward one-third to one-fifth of the skid 74.

Figure 10:
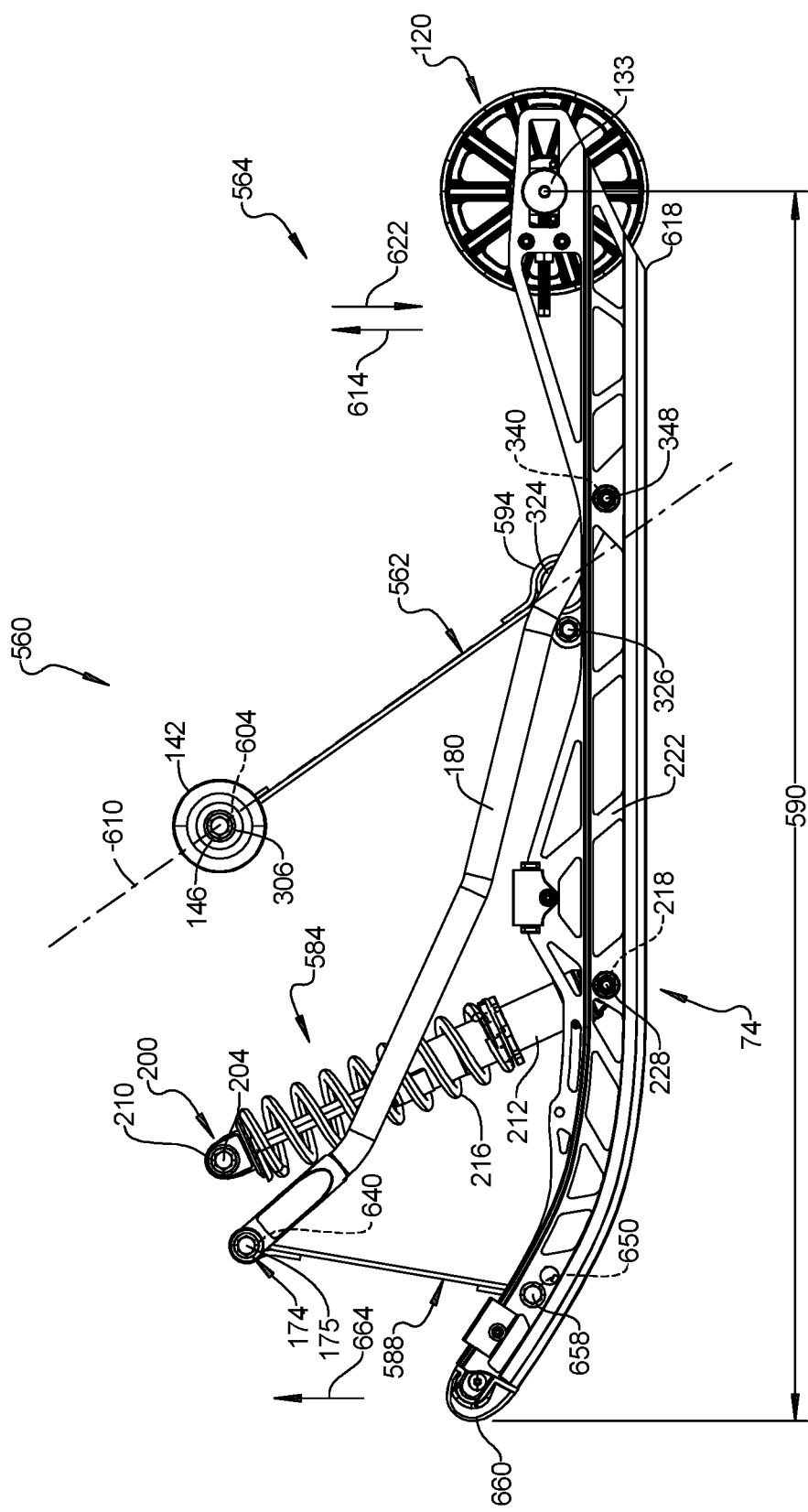
FIG. 10 is a side plan view of a suspension assembly, according to various embodiments.
Figure 11:
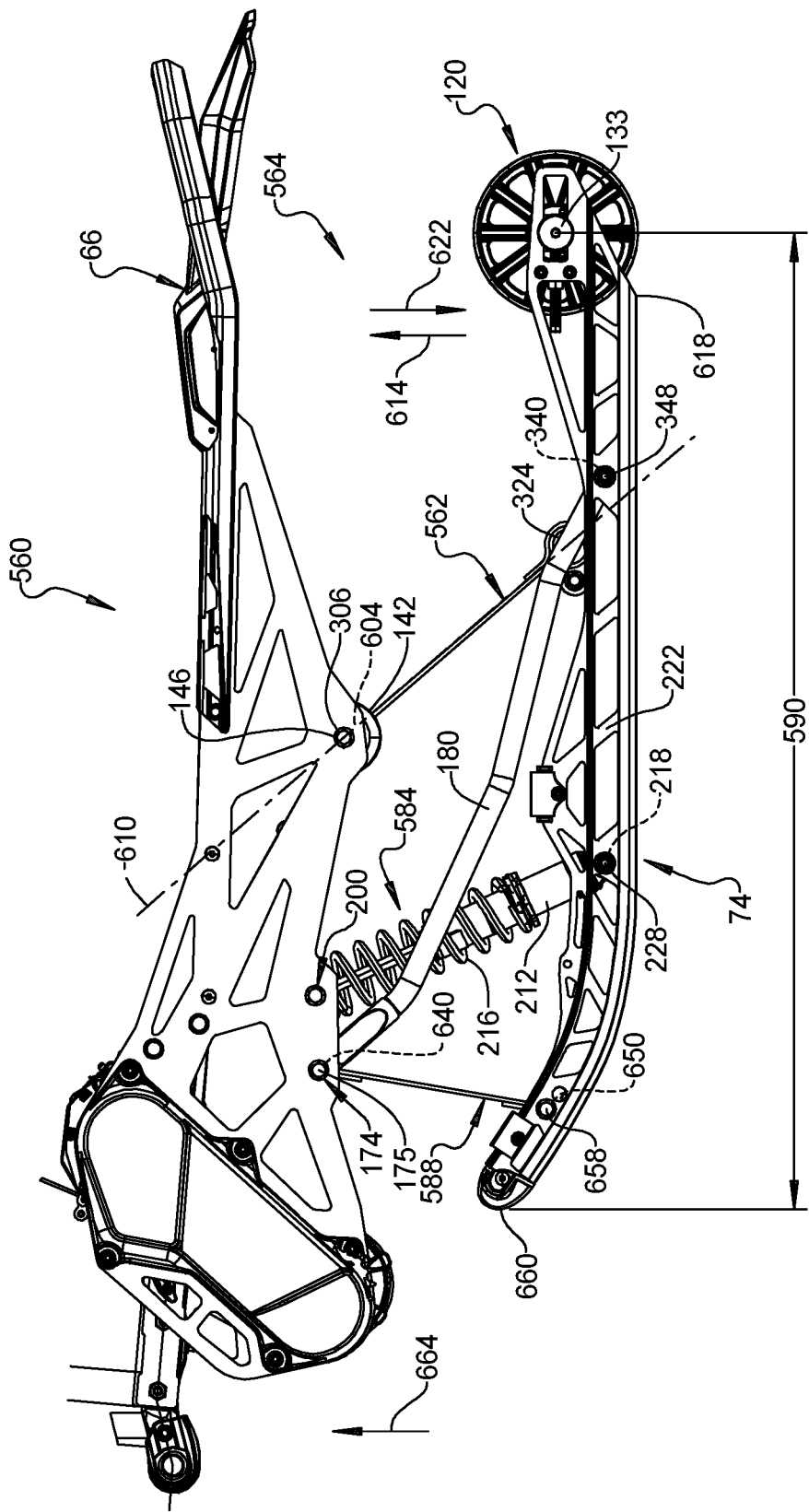
FIG. 11 is a side plan view of a track chassis assembly including the suspension assembly of FIG. 10.

With continuing reference to FIG. 1 through FIG. 9 and additional reference to FIG. 10, a track chassis assembly 560 is illustrated. The chassis assembly 560 may include portions that are substantially similar or identical to the chassis assembly 60, discussed above, and will not be repeated here below, but like reference numerals refer to like or identical features. Generally, the chassis assembly 560 may include the top or upper portion 66, as described above. The chassis assembly 560 may include the skid assembly 74. The skid assembly 74 may include the skid side rails 222, 226, as discussed above. The chassis assembly 560 may further include the rear track guide rails or guide assembly 120 similar or identical to the guide assembly 120 of the chassis assembly 60.

The chassis assembly 560 includes a suspension assembly 564 to assist in guiding or moving the skid assembly 74 relative to the frame 36 and/or the top portion 66 of the chassis assembly 560. The suspension assembly 564 may generally be referred to as or include only a single shock and two strap suspension assembly that includes a single shock assembly 584 in additional and/or combination with a first or forward strap 588 and a second or rearward strap 562. The straps 588, 562 may be any appropriate type of strap that generally has a high tensile strength, but is flexible under a selected load. Accordingly, during movement of the skid assembly 74 relative to the top portion 66, the straps 562, 588 may flex between or relative to the skid assembly 74, as discussed further herein. It is understood, however, that either or both of the forward strap 588 and the rearward strap 562 are merely exemplary and optional. Further, the straps 588, 562 allow adjustment and limitation of downward travel of the torque arm assembly 67 and/or skid 74.

The shock assembly 584 may be substantially similar or identical to the forward shock assembly 86 and the track chassis assembly 60 including the suspension assembly 64. Accordingly, the shock assembly 584 may be an appropriate design, such as a coil over design including an internal damper or shock member 212 and an external spring 216. The shock assembly 584 may interconnect at the first connection or crossbar 200 that extends between the frame members 70, 72 and may be fixed thereto with respective connection members, such as the bolt 204. The shock assembly 584 may have the first connection 210 that movably connects to the first shock connection 200, such as allowing rotation relative to the connection member 200. Similarly the shock assembly 584 may connect to a second connection, such as the second connection 218 that extends between the two skid assembly frames 222, 226 and may be connected thereto with selected connection members, such as the bolt 228. The shock assembly 584 may, also, rotate relative to the second interconnection member 218, as discussed above. Accordingly, the shock assembly 584 may compress relative to the skid assembly and/or rotate relative to the skid assembly either individually and/or simultaneously.

The suspension assembly 564 includes the torque arm assembly 67 including the torque arms 180, 184. The torque arms 180, 184 extend from the forward or first torque arm connection member 174 that extends and is connected to the frame members 70, 72 such as with selected connection members, such as the bolt 175. The torque arms 180, 184 extend from the first connection member 174 to the rear connection member 340 that may extend between the skid frame rails 222, 226 and may be connected thereto such as with connection members including the bolt 348. The torque arms 180, 184, therefore, may also move relative to the skid assembly 74 and the chassis assembly 560 such as by rotation around the connection member 340 and/or the forward connection member 174.

The forward connection member 174 may generally be in the first or forward one-third or one-quarter of a length 590 of the skid assembly 74, such as the distance 362. The rear connection member 340 may be in a rear or second one-fourth or one-third of the lengths 590 of the skid assembly 74, such as the distance 401. Accordingly, the torque arms 180, 184 may extend a majority of distance or interconnect two points that extend the majority of the distance 590 or the length of the skid assembly 74. The length 590 of the skid assembly 74 of the chassis assembly 564 may be about 50 cm to about 150 cm, including about 85 cm to about 125 cm and may be measured from the forward point 660 to the rear carrier axle 133.

In addition to the torque arms 180, 184 and the shock assembly 584, the straps 562, 584 may interconnect the suspension assembly 564. The first or rearward strap assembly 562 may interconnect the connection bar or member 324, to which the rearward shock assembly 584 is connected, and the connection member 146 that supports the guide members 142. The strap 562 may have a first end 594 that is connected directly to the crossbar or connection bar 324 rather than the ears or extension 326. It is understood, however, that the strap first end 594 may also be connected to the extensions 326, if selected. Again, the strap assembly 562 may assist in achieving a selected geometry of the skid assembly 74 relative to the upper or top member 66, of the chassis assembly 560. The strap assembly 562 may further include a second end 604 that is connected to the crossbar or holding member 146 that extends between the frame members 70, 72 and may be connected with selected connection members, such as the bolt or nut 306. Also disposed or positioned on the cross member 146 may be the track carriers 142.

Thus, the strap assembly 562 that extends between the first end 594 and the second end 604 may generally extend along an axis 610 that is the same or similar to an axis 84x of the rearward shock assembly 64 when the strap 562 is in an extended position. As illustrated in FIG. 10, the strap assembly 562 is in a fully extended position as is the suspension assembly 564. In this position, the axis 610 the strap assembly 562 may be substantially to the axis 84x of the rearward shock assembly 84 in the fully extended position of the suspension assembly 64. It is understood, however, that the connection point of either of the end 594, 604 of the strap assembly 562 may alter the position of the axis 610, but the strap assembly 562 is generally positioned in the position of the rearward shock assembly 84 as described above in the suspension assembly 64.

As discussed above, however, the strap assembly 562 may be formed of a flexible material. The flexible material may include nylon, rubber, steel cable, steel reinforced rubber, Kevlar® fiber material or items reinforced therewith which may flex under a selected load. Accordingly, although FIG. 10 illustrates the suspension assembly 564 in a fully extended position of the strap 562, the strap 562 may bend or flex to allow the connection member 324 to move closer to the connection member 146 then illustrated in FIG. 10. Accordingly, therefore, the connection member 324 may generally move in the direction of arrow 614 to allow the strap 562 to deform or compress as the skid assembly 74, or a rearward portion or end 618 thereof moves in the direction arrow 614. The strap assembly 562, however, such as in the fully extended position as illustrated in FIG. 10, can limit a travel of the rear end 618 of the skid assembly 74 in a direction substantially opposite to the arrow 614, such as in the direction of an arrow 622. The strap assembly 562, therefore, may limit the movement of the rear 618 of the skid assembly 74 in the direction of arrow 622 and bias movement of the skid assembly 74 to compress the shock assembly 584 and/or compress or flex the second or forward strap assembly 588.

The forward strap assembly 588 may extend from a first end 640 that is connected to the forward or first torque arm connection 174. The strap assembly 588 may extend from the first end 640 to a second strap end 650 at a second strap connection member 654. The second strap connection 654 may extend between the skid rail 222, 226 and may be connected thereto, such as with bolts or nuts including a bolt 658. The second strap end 650 may be fixed to the strap connection member 654 in any appropriate manner, such as being wrapped around or fixed to the crossbar 654.

As illustrated in FIG. 10, the forward strap 588 is illustrated in a fully extended position between the torque arm connection bar 174 and the second strap connection bar 654. As discussed relative to the first or rearward strap 562, however, the strap 588 may be formed of a similar material that is also able to flex under a selected load. Accordingly, a forward end or portion 660 may be able to move in a direction such as the direction of arrow 664, such as when engaging a bump or additional load added by the user 39 at or near the front 660 of the skid assembly 74, due to flexing of the strap 588. The strap assembly 588, therefore, may allow the forward end 660 of the skid assembly 74 to move toward the connection bar 174 due to flexing or compression of the strap assembly 588.

As illustrated in FIG. 10, however, in the fully extended position, the strap 588 may apply a force to or near the forward end 660 of the skid assembly 74 to limit an extension or movement of the connection bar 174 away from the connection bar 654. This may cause the shock assembly 584 to compress and/or the rearward strap assembly 562 to compress when the forward strap 588 is in the fully extended position and a force is applied to the skid assembly 74 and/or relative to the skid assembly 74, such as near the rear 618 of the skid assembly 74.

Accordingly, the suspension assembly 564 may be incorporated into the track chassis 560, such as to replace portions or all of the suspension assembly 64 of the chassis assembly 60, discussed above. In so doing the suspension assembly 564 may include only the single shock assembly 584, rather than a plurality of the shock assemblies, as discussed above, but still allow the chassis assembly 560 to be connected to the frame 36 to form the vehicle 30, as discussed above. The suspension assembly 564, therefore, may reduce elements included in the suspension assembly 564, such as including only the single shock assembly 584, relative to other combinations.

Figure 12:
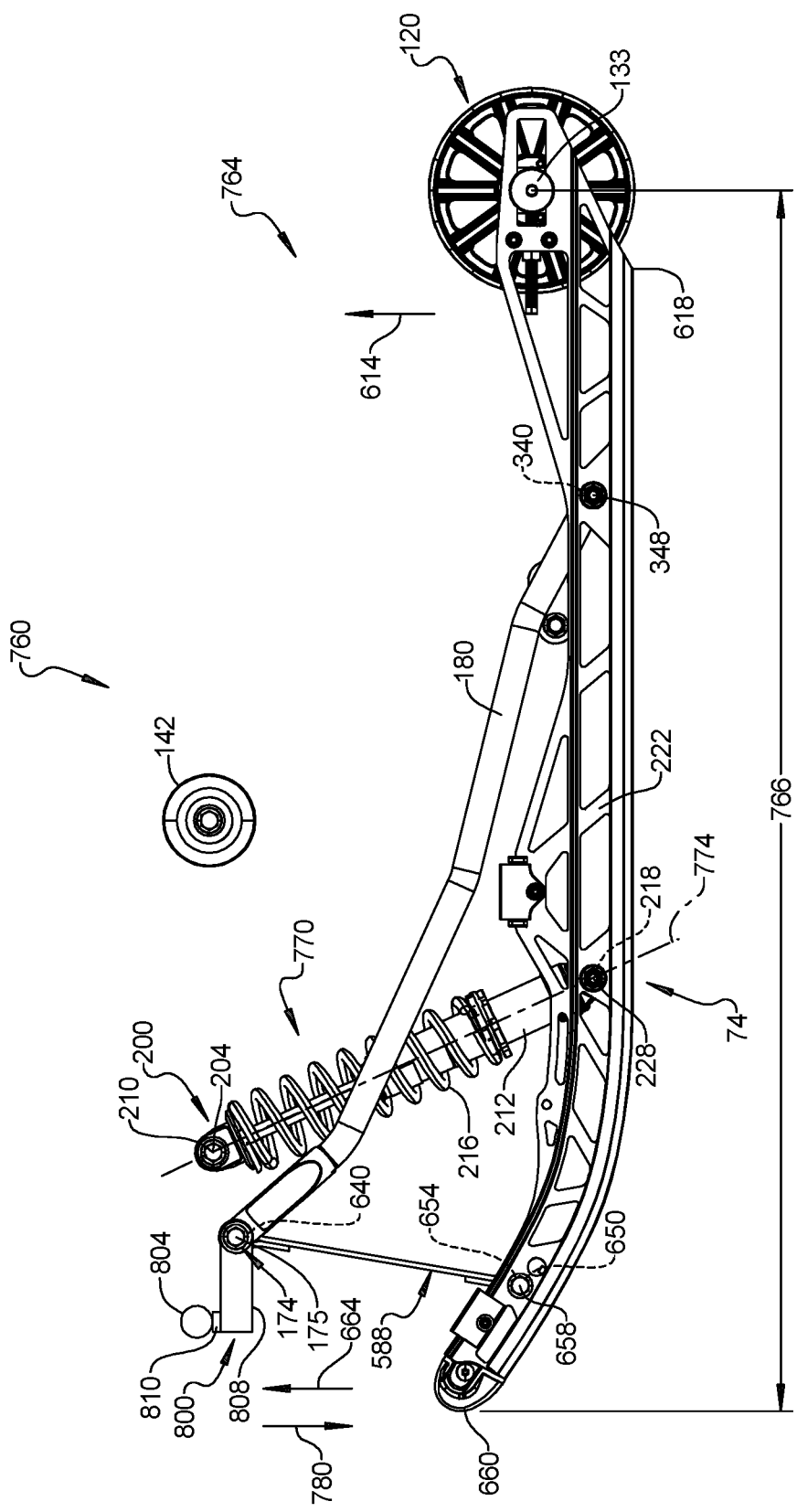
FIG. 12 is a side plan view of a suspension assembly, according to various embodiments.
Figure 13:
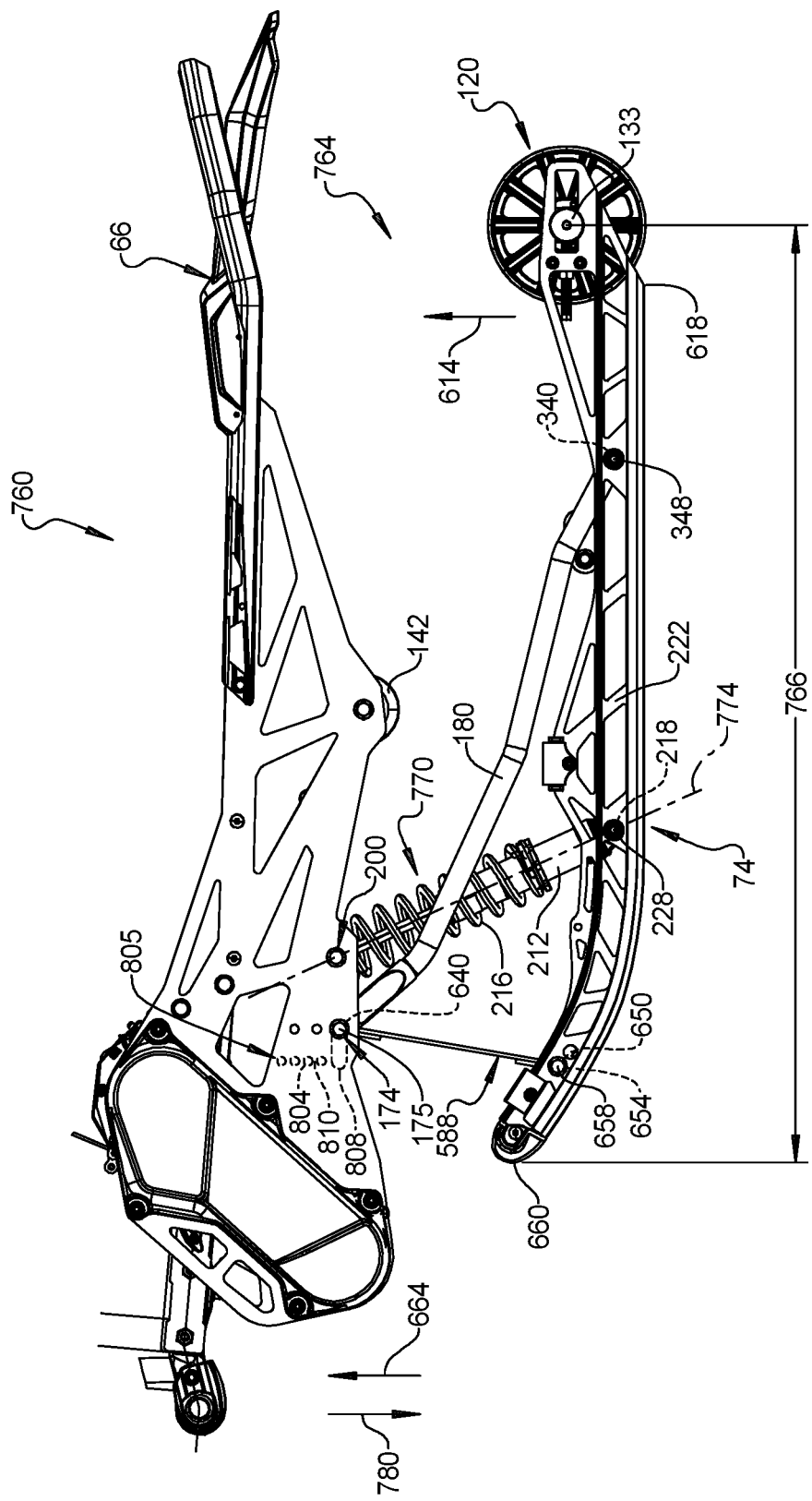
FIG. 13 is a side plan view of a track chassis assembly including the suspension assembly of FIG. 12.

With reference to FIG. 12 and FIG. 13, a track chassis assembly 760 is illustrated that includes a suspension assembly 764. The track chassis assembly 760 may include portions that are substantially identical to or similar to the portions of the track chassis assembly 60, as discussed above. Accordingly, the same or similar parts will not be discussed in detail here, however, like reference numerals will refer to similar or like parts. The track chassis assembly 760, therefore, includes the skid assembly or portion 74 and respective side walls or rails 222, 226, as discussed above. Further, the skid assembly 74 may extend from the rear or back end 618 to a front or forward end 650 and may extend a distance 766 therebetween. It is understood that the distance 766 may be the same or similar to the distances discussed above, such as the distance 550, but need not be the same. The length 766 of the skid assembly 74 of the chassis assembly 760 may be about 50 cm to about 150 cm, including about 80 cm to about 125 cm and may be measured from the forward point 660 to the rear carrier axle 133. Further the chassis assembly 760 may include the rearward belt carrier or guide 120 and the upper or mid-belt guides 142. The rear track guide 120 may be near the rear portion 618 of the skid assembly 74 and the mid-belt guide assemblies 142 may extend around or be positioned relative to the guide holding or fixation bar 146, as discussed above.

The suspension assembly 764 may further include the torque arms 180, 184, as discussed above. It is understood, in a static position the left and right torque arms 180, 184 may obscure the other respective torque arm, but the other torque arm is present, as illustrated in FIG. 12. Thus, discussion herein of one torque arm 180 relates to the right torque arm 184, unless otherwise stated. The torque arms 180, 184 may extend from the forward connection member 174 that is fixed to the respective frame members 70, 72 with selected fixation members, such as the bolt or fixation member 175. The torque arms 180, 184 extend to the second connection member 324 that is fixed between the skid rails 222, 226 with selected fixation members, such as the bolt or nut 348. The torque arm 180 is connected at the two ends of the torque arm 180 at selected locations, such as at the first connection member 174 being in a first quarter or one-third of the distance 760 relative to the front end 660 and the second connection portion 324 being in a second one-fourth or one-third of the length 760 from the back end 618. The torque arms 180, 184 may rotate relative to the forward connection portion 174 and the rearward connection portion 324, as discussed above. Accordingly, the skid assembly 74 may move relative to the outer portion 66 during movement or operation of the suspension assembly 764.

The suspension assembly 764 may further include a shock assembly 770 which may similar to the shock assembly 584 or the forward shock assembly 86, as discussed above. The shock assembly 770 may include an internal damper 212 and a coil over or over spring 216, such as in a coil over configuration, as discussed above. The shock assembly 770 may extend and connect to the first connection portion or bar 200 that is connected to the frame members 70, 72 with fasteners, such as the fastener bolt 204. The first or upper end of the shock assembly 770 may include the first end 210 that is rotatably connected to the connection bar or member 200. The shock assembly 770, therefore, may rotate relative to the connection bar 200 due to the first connection end 210. The shock assembly 770 may further extend to a second end that connects to a second end connection portion or bar 218 that extends between the skid rails 222, 226. The second end connection bar 218 may be fixed to the respective skid rails 222, 226 with appropriate connection portions, such as a bolt or nut 228. The shock assembly 770 may also rotate relative to the second connection bar or member 218, as discussed above.

Accordingly, during operation or movement of the suspension assembly 764, such as movement of the skid assembly 74 relative to the upper member or 66, the shock assembly 770 may compress along a long axis 774 of the shock assembly 770 and/or rotate around the respective holding or mounting bars 200, 218. Additionally, as discussed above, the skid assembly 74 may rotate relative to the torque arm 180 around the fixation or holding bar 324, as discussed above. The suspension assembly 764 may further include the rear strap or first strap assembly 562.

The suspension assembly 764 may further include the front strap 588. The front strap 588 may be substantially identical to or similar to the front strap 588 discussed above. Again, the front strap 588 is merely optional and exemplary. Accordingly, the front strap 588 may connect to the front torque arm connection forward member 174, in any appropriate manner, such as being wrapped around or extending around or fixed to the connection bar 174. The front strap 588 further includes a second end 650 that connects to the connection bar or crossbar 654 that may extend between the skid rails 222, 226. As discussed above the connection bar 654 may extend between or be fixed to the side rails 222, 226 on an appropriate fixation member, such as the fixation member 658. The front strap 588, therefore, interconnects the torque arm connection bar 174 with a forward portion of the skid assembly 74, such as near the forward end 660. The connection bar 654 may be substantially along an axis or a line perpendicular to a base of the skid assembly 74 relative to the connection of the torque arm connection bar 174 or may be forward of or nearer to the forward end 660 than the connection bar 174. Regardless, as discussed above, the suspension strap 588 may be formed of a flexible material that flexes under a selected load, such as a load applied to or near the forward end 660 of the skid assembly 74 generally in the direction of arrow 664. The strap 588, however, may be substantially straight when the suspension assembly 764 is substantially fully extended.

Further the suspension strap 588 may limit movement of the forward and 660 of the skid assembly when a force is applied relative to or near the rear end 618 of the skid assembly 74, such as generally in the direction of 614. The suspension strap 588 may limit or restrict movement generally in the direction of arrow 780 including movement of the forward end 660 of the skid assembly 74 away from the upper or member 66 when a force is applied generally in the direction of arrow 614. The skid assembly 74, however, may rotate or move at the rear end 618 due to the movement of the torque arms 180, 184 relative to the connection bar 324 and/or the suspension assembly 770.

Accordingly, the front or forward strap 588, as discussed above in the suspension assembly 564, may limit the amount of movement of the rear end portion 618 of the skid assembly 74 generally in the direction of arrow 614 by limiting an amount of movement relative to the upper 66 even upon application of a force substantially near the rear end 618 of the skid assembly 74. The strap assembly 588 may also limit the amount of movement of the forward end 660 of the skid assembly 74 generally in the direction of arrow 780 given an application of force at the rear end 618 of the skid assembly 74. However, as discussed above, the strap assembly 588 may flex or compress when a force is applied in the direction of the arrow 664 near the front or forward end 660 of the skid assembly 74. Thus the strap assembly 588 may act as the limiter strap on motion of the skid assembly 74 relative to the top member 66.

The suspension assembly 764, as illustrated in FIG. 12 and FIG. 13, in various embodiments, includes only the forward strap 588, the torque arms 180, 184, and the shock assembly 770. These active or moveable components of the suspension assembly 764 may control or limit movement of the skid assembly 74 relative to the upper 66. As discussed above, the strap 588 allow adjustment and limitation of downward travel of the torque arm assembly 67 and/or skid 74.

Various hard stops may also, however, limit a maximum amount of motion or position of the track chassis assembly 760. For example, a stop assembly or stop portion 800 may be fixed or mounted relative to the upper or end connection arm 174 near the end of the torque arms 180, 184. The stop assembly 800 may include a stop or contact bar 804 that is connected to the upper frame at one or more holes 805. Thus, the stop bar 804 is fixed to the upper freframe 66. A ledge or finger 808 is fixed to the mounting bar 174 and may extend forward of the mounting bar 174. Various bumpers or shock absorption portions 810 may be positioned between the stop bar 804 and/or and the extension bar 808 to minimize or reduce a jolt or jounce and dampening a selected sound. The stop bar 804, therefore, may limit the amount of motion of the top portion 66 relative to the skid assembly 74, such as generally in the direction of arrow 780 and/or arrow 664. In various embodiments, the bar 808 may engage the bar 804 as the suspensions extends and limit the maximum extension of the suspension assembly 764. Thus, the hard stop assembly 800 may limit the maximum amount of travel, without changing or altering a dynamic of the suspension assembly 764 caused by the other portions, as discussed above.

In various embodiments, the stop bar 804 may be mounted in selected one or more holes 805 formed in the upper frame 66. The different holes 805 allow the distance of the stop assembly 804 to be moved relative to the body 66 and in a fixed position relative to the skid 74. Thus, changing the location of the bar 804 via the holes 805 changes the maximum amount of movement, such as the amount of maximum extension of the suspension assembly 764 to selected ride quality, rider comfort, etc.

Figure 14:
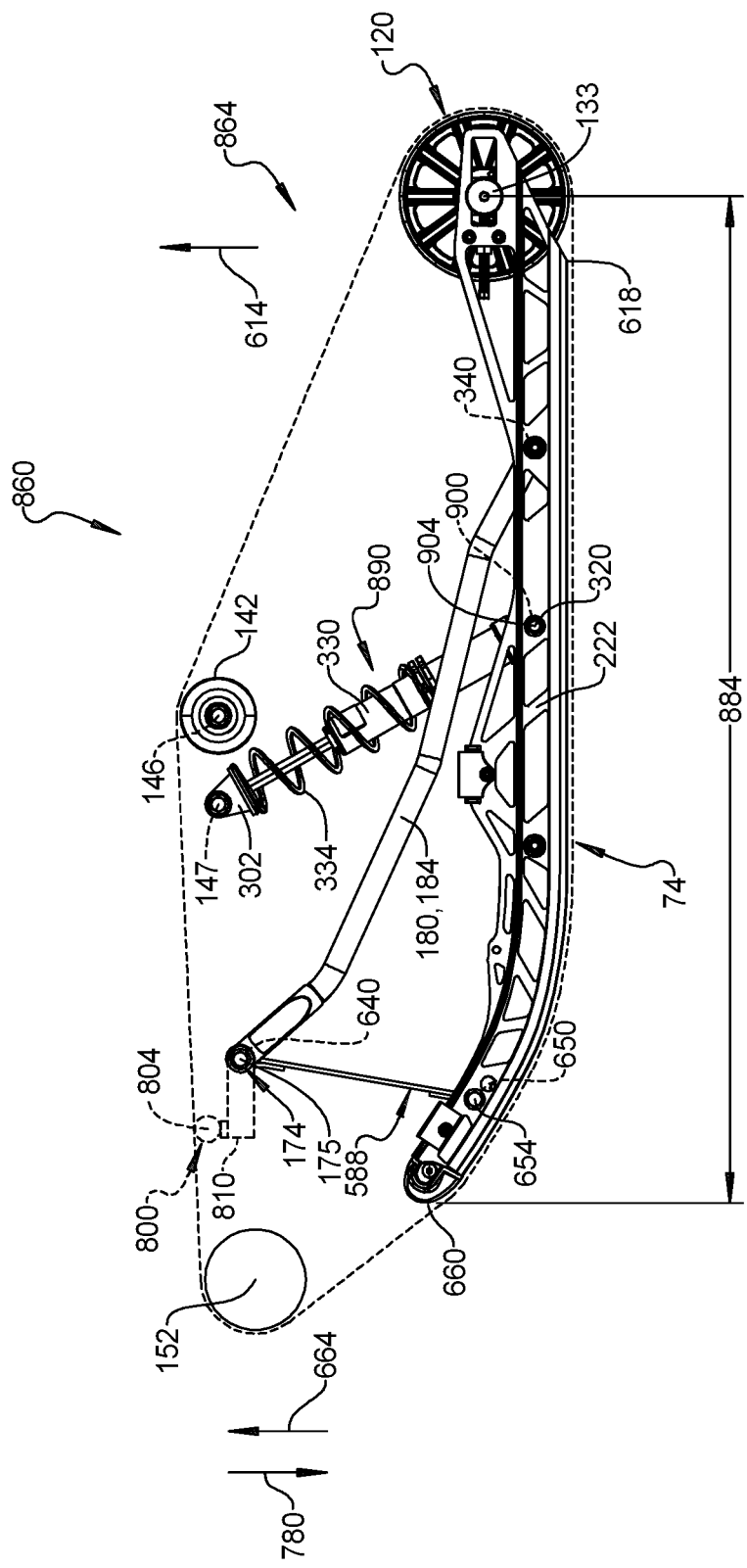
FIG. 14 is a side plan view of a suspension assembly, according to various embodiments.
Figure 15:
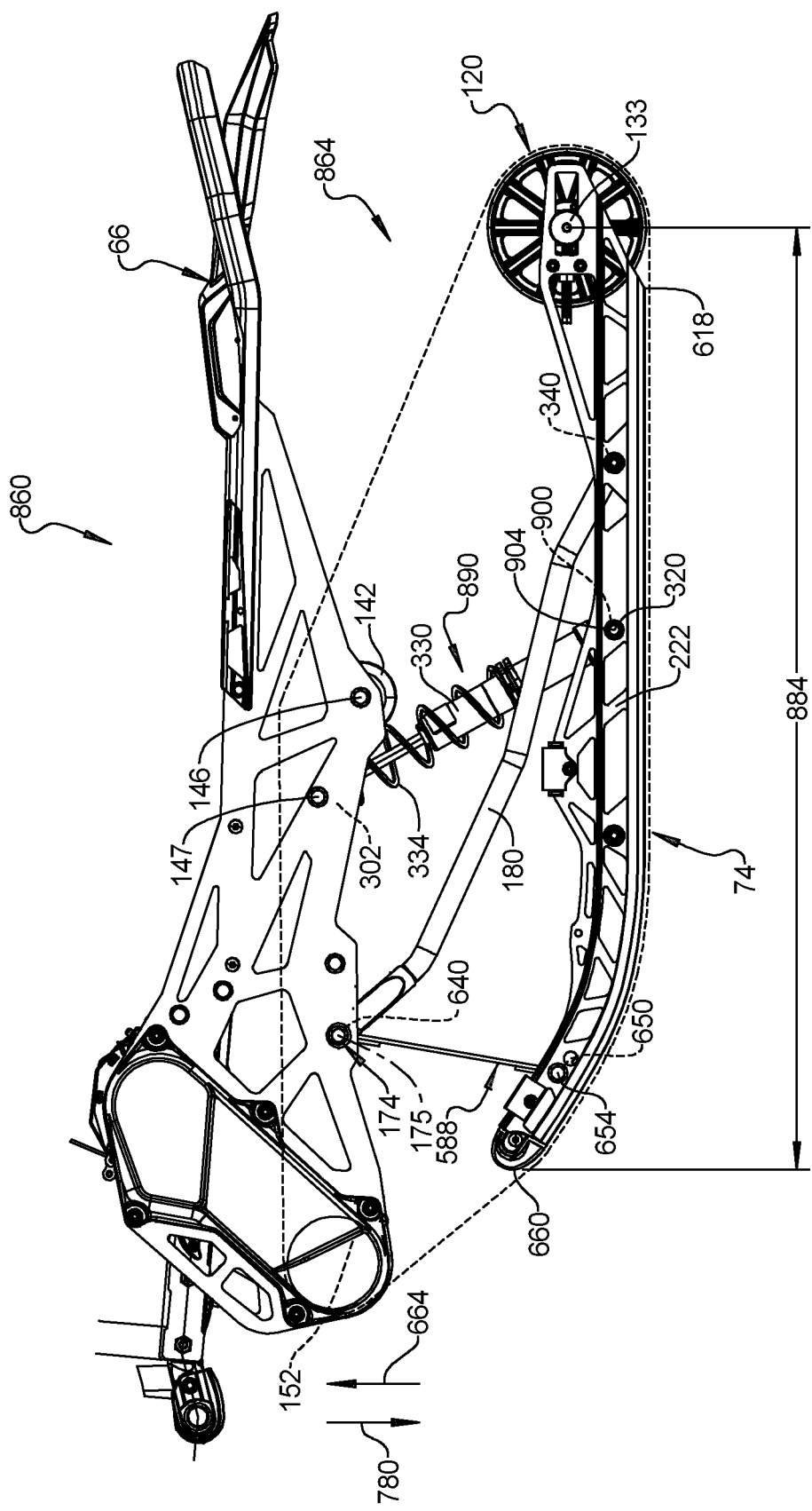
FIG. 15 is a side plan view of a track chassis assembly with the suspension assembly of FIG. 14.

Turning reference to FIGS. 14 and 15, a track chassis assembly 860 is illustrated. The track chassis assembly 860 may include portions similar to the track chassis assembly 60, discussed above, and like portions will not be described in detail again here, but reference numerals that are the same may refer to the same portions as discussed above. The chassis assembly 860 further includes a suspension assembly 864 that may also include various portions similar to those discussed above, where like portions will be referred to with like or similar reference numerals.

The suspension assembly 864 generally includes the single torque arm assembly 67 having the torque arms 180, 184 that extend from a first or forward connection member 174 that may extend between the frames 70, 72 and a rear or second connection member 324 that may extend between the rail or skid assembly frame members 222, 226. The skid assembly 74 generally extends from the front or forward end 660 to the rear end 618 and may generally extend a distance 884. The distance 884 may be similar to the distances of the skid assembly 74, such as those discussed above, including the distance 760 or the distance 590. The length 884 of the skid assembly 74 of the chassis assembly 860 may be about 50 cm to about 150 cm, including about 85 cm to about 125 cm and may be measured from the forward point 660 to the rear carrier axle 133. The rearward torque arm connection 324 may generally therefore be in a rear third of the distance 884 while the front torque arm connection 174 may be in a forward one-third of the distance 884 relative to the skid assembly 74.

The suspension assembly 864 may, in various embodiments, further includes a forward or strap assembly 588 similar to the forward strap assembly 588 discussed above. Again, the forward strap 588 is merely exemplary and optional. The strap assembly 588 may extend from the forward torque arm connection member 174 to the second strap end 650 that is connected to the strap connection bar 654 that extends between the rail walls or members 222, 226, as discussed above. The strap assembly 588 may be compressible or flexible, as also discussed above, and compress when a force is applied generally in the direction of arrow 664 such as near the front portion or end 660 of the skid assembly 74.

The suspension assembly 864 may further include a single shock or suspension member assembly 890 that may be similar to the shock assembly 584 or 84, as discussed above. The shock assembly 890 may include an internal damper or member 330 and an external spring member 334 in a coil over shock assembly. It is understood that the spring 334 may extend over a length of the shock assembly 890, or only a portion thereof.

The shock assembly 890 may be connected at a first end 302 at a connection member assembly 147. The shock connection assembly 147 may be similar to the shock connection 200, discussed above, and will not be described in detail here. Nevertheless, the connection member 147 may engage or connect to the end 302 of the shock assembly 890. The connection assembly 147 may further be connected to the upper frame portions 66 separate from the carrier roller connection 146. The carrier roller connection 146 may also include carrier rollers or members 142 to assist in guiding or carrying the belt 80, as discussed above.

The shock assembly 890 may further extend to the second end 320. The second end 320 may be connected directly to a shock holder or connection bar 900. The connection bar 900 may be connected between the rails 222, 226 and fixed with a selected member, such as a connection member including a bolt or nut 904 in a manner similar to the connection rod or member 324 connecting to the torque arms 180, 184. Thus, the second end 320 of the shock may be connected directly to the rails 222, 226 and not to the torque arm assembly 67.

As discussed above, the rearward shock assembly 84 may be connected to the torque arms 180, 184 as discussed above. However, as illustrated in FIG. 14 and FIG. 15, the shock assembly 890 may be connected to the connection bar 900 that extends between and is connected to the skid assembly rails or frame members 222, 226 and not connected directly to the torque arms 180, 184. Accordingly, the shock assembly 890 may have the first end or an upper end 302 and the second or lower end 320 connected between the mounting points or members 174, 324 relative to the forward end 660 and the rearward end 618 of the skid assembly 74 separate from the torque arms 180, 184. Thus, the shock assembly 890 may operate independently of the torque arms 180, 184 upon the application of a force to the skid assembly 74.

The strap assembly 588, as illustrated in FIG. 14, may be positioned in a fully extended position when a load is not applied to the suspension assembly 864. Upon the application of a force near the rear end 618 of the skid assembly 74, such as generally in the direction of the arrow 614, the strap assembly 588 may limit the amount of or eliminate movement of the forward end 660 of the skid assembly 74 generally in the direction of the arrow 780, such as away from the upper 66. The torque arms 180, 184 may mitigate or direct a travel of the skid assembly 74 relative to the upper member 66 as will the shock assembly 890 being separate from the torque arms 180, 184 and positioned between the torque arm mounting members 174, 324.

Further the suspension assembly 864 may include a stop assembly 800 (shown in phantom), similar to the stop assembly 800 discussed above. The stop assembly 800 may include the stop shaft or rod 804 that is fixed to the torque arm mounting rod or member 174 by the extension or connection member 810. The stop assembly 800 may limit the motion of the top member 66 relative to the skid assembly 74, such as by providing a hard stop or physical barrier to movement of the upper member 66 relative to the skid assembly 74.

Figure 16:
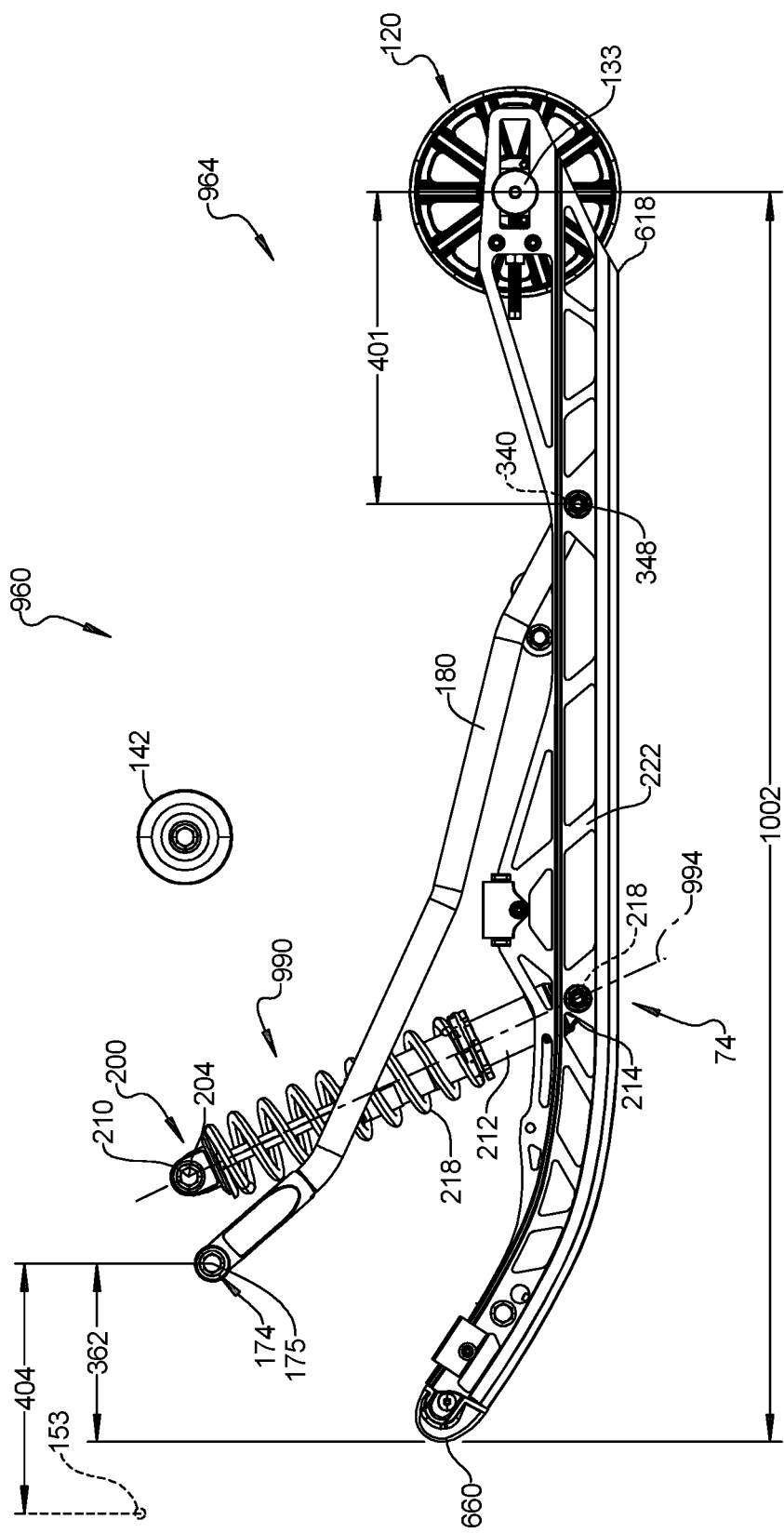
FIG. 16 is a side plan view of a suspension assembly, according to various embodiments.
Figure 17:
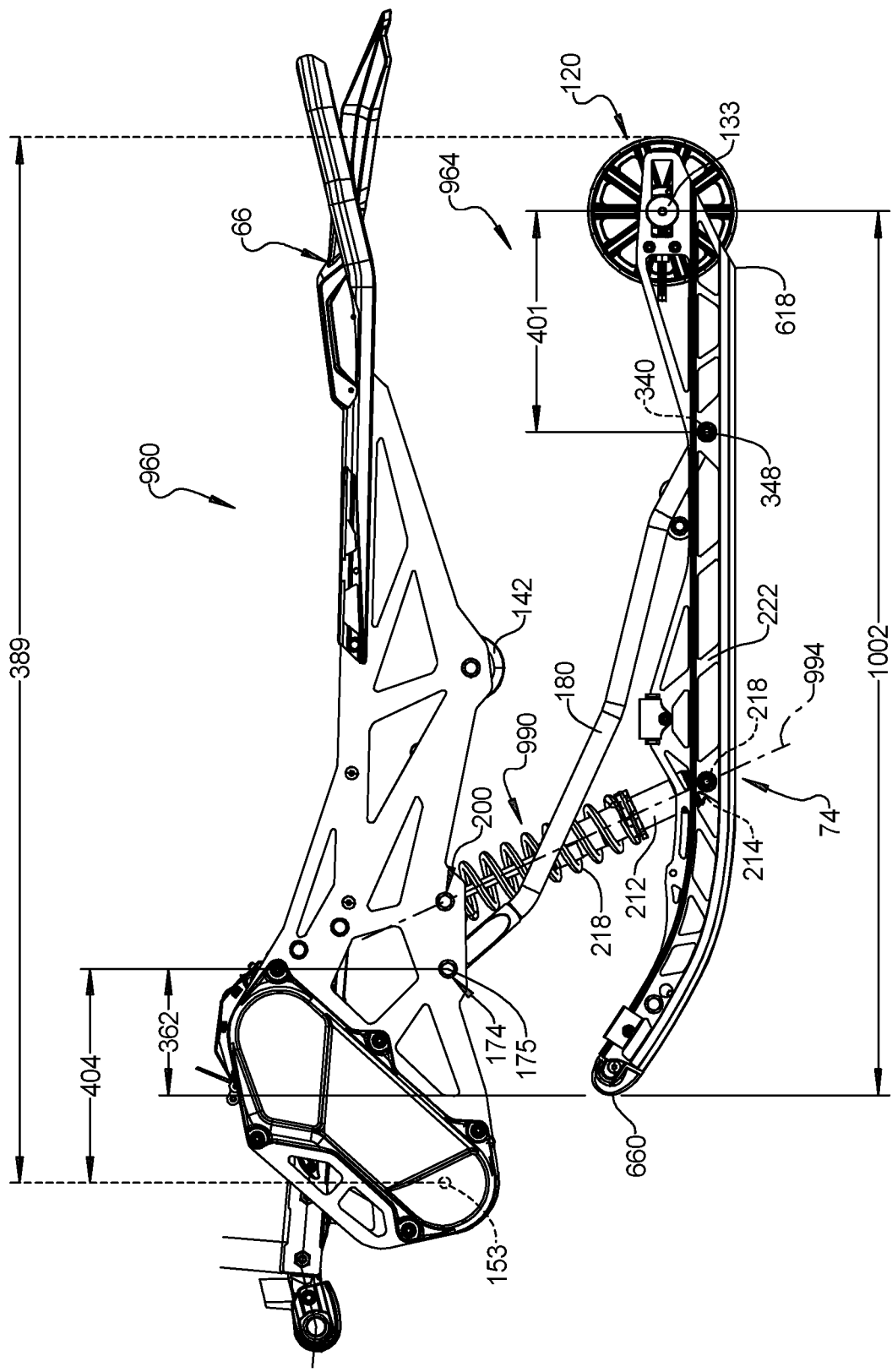
FIG. 17 is a side plan view of a track chassis assembly with the suspension assembly of FIG. 16.

Turning reference to FIG. 16 and FIG. 17, a track chassis assembly 960 is illustrated. The track chassis assembly 960 may include a suspension assembly 964. The track chassis assembly 960 may further include portions similar or identical to the track chassis assembly 60 discussed above, and those portions will not be described in detail here below, but like reference numerals will be used to describe like parts. Generally, the track chassis assembly 960 includes the upper portion 66 and the skid assembly 74 with the rear track guide assembly 120 mounted to the skid assembly 74. The skid assembly 74 may extend from the rear end 618 to the forward end 660 and may include side walls or rails 222, 226.

The suspension assembly 964 generally includes the single torque arm assembly 67 including the torque arms 180, 184. The torque arms 180, 184 extend from the first or forward torque connection member 174 to the second or rearward connection member 324. The first or forward torque connection member 174 extends between the frame member 70, 72 and may be fixed thereto with a selected fixation member, such as the connection member 175. The second or rearward connection member 324 extends between the rail or skid frame members 222, 226 and may be fixed or fasten thereto with selected fasteners, such as the bolt or nut 348. The torque arms 180, 184 may rotate about the selected mounting portions 174, 324 to allow for motion or movement of the skid assembly 74 relative to the upper member 66, as discussed above.

The suspension assembly 964 may further include a single shock assembly 990. The single shock assembly 990 may be similar to the forward shock assembly 86, as discussed above. The single shock assembly 990, therefore, may include the coil over shock design that then includes the inner cylinder or dampener 212 and an external spring or ride high component 216. The shock assembly 990 further extends from the first connection end 210 that connects to the connection member or rod 200. The suspension or shock mount member 200 may be fixed to the frame member 70, 72 with selected fasteners, such as the bolts or fasteners 204. The shock assembly 990 further extends to the second or opposite end 214 that is connected to the shock mounting member 218. The shock mounting member 218 extends between the rail members 222, 226 and may be fixed or fastened thereto with selected fasteners, such as the bolt or fastener member 228.

The shock or suspension member 990 may include the ends 210, 214 that may rotate around the respective mounting members 200, 218 upon movement of the skid 74 relative to the upper member 66. The shock assembly 990 may also compress along a long axis 994 of the shock assembly 990. Further, as discussed above, the shock assembly 990 is mounted to the mounting members 200, 218 that are fixed to the respective upper frame member 70, 72 and skid assembly rails 222, 226. Accordingly, the shock assembly 990 is not mounted directly to the torque arms 180, 184, or mounting portions for the torque arms 180, 184.

The shock assembly 990 may move independently of the torque arms 180, 184 during operation of the suspension assembly 964. In this way, movement of the skid assembly 74 relative to the upper 66 may be managed and determined at least in part due to the positioning of the torque arm ends and mounting portions 174, 324 relative to a length 1002 between the forward end 660 and rearward end 618 of the skid assembly 74. As discussed above the forward torque arm mounting member 174 may be positioned a distance 362 rearward or inboard from the forward end 660 of the skid assembly 74 and or the distance 404 rearward of the drive axis 153. It is understood, however, that the distances may be altered in the single torque arm 67 and single shock 200 suspensions assembly 964. Similarly the rear torque arm mounting member 324 may be positioned a distance 401 forward or inbound of the rear end 618 of the skid assembly 74. The forward torque arm mounting member 174, however, is generally positioned within the forward one-third or one-fourth of the distance 1002 and the rear torque arm mounting portion 324 is positioned in the rearward one-fourth or one-third distance 1002 relative to the rear portion or end 618. The length 1002 of the skid assembly 74 of the chassis assembly 960 may be about 50 cm to about 150 cm, including about 85 cm to about 125 cm and may be measured from the forward point 660 to the rear carrier axle 133.

The suspension assemblies 64, 564, 764, 864, and 964 may include various portions, as discussed above, to control or limit movement of the skid assembly 74 relative to the upper member 66 of the track chassis assemblies. The respective suspension assemblies, however, generally include the single torque arm assembly 67 having the torque arms 180, 184 to assist in directing or limiting motion of the skid assembly 74 during operation of the vehicle 30. The torque arms 180, 184 are generally or substantially rigid between the mounted ends in the respective suspension assemblies. Thus, the torque arms 180, 184 are not intended to bend or flex, therefore, generally bend or flex not more than about 0.1% to about 10%, including less than about 5%, and further less than about 2% during operation of the vehicle 30. In this way, movement of the skid assembly 74 relative to the top member 66 is controlled by the torque arms 180, 184 that extend from the top member 66 near the forward end 660 of the skid assembly 74 to the near the rear 618 of the skid assembly. The single torque arm assembly 67, therefore, provides substantially the only rigid connection between the skid assembly 74 and the upper member 66. In various embodiments, only a single shock assembly may be provided either alone or in combination with suspension straps to assist in managing movement of the track skid assembly 74. The track skid assembly 74, however, may operate to maintain a selected tracked tension and contact with a surface during operation of the vehicle 30.

Example embodiments are provided so that this disclosure will be thorough, and will fully convey the scope to those who are skilled in the art. For example, the vehicle 30 may be any appropriate vehicle. As discussed above, in various embodiments, the vehicle 30 may be a snowbike. The vehicle may also or alternatively be wheeled or tracked and include a snowmobile, motorcycle (e.g. dirt bike), all-terrain vehicle, etc. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly for a vehicle for operation on a surface, comprising:
   a track chassis operable to be removably connected to a vehicle frame member, wherein the track chassis includes:
   a skid assembly;
   a top assembly;
   a suspension assembly having at least (i) a shock assembly and (ii) a single torque arm assembly;
   wherein the single torque arm assembly extends from a forward portion of the track chassis that is forward of the shock assembly to a rear portion of the track chassis that is rearward of the shock assembly.

2. The assembly of claim 1, wherein the shock assembly includes a damper portion and a spring portion.

3. The assembly of claim 1, wherein the suspension assembly includes a forward torque arm connection and a rearward torque arm connection;
   wherein the forward torque arm connection is fixed to the top assembly; and
   wherein the rearward torque arm connection is fixed to the skid assembly.

4. The assembly of claim 3, wherein a first end of the shock assembly is fixed to the top assembly and a second end of the shock assembly is fixed to the skid assembly.

5. The assembly of claim 4, wherein the shock assembly is fixed within the track chassis between the forward torque arm connection and the rearward torque arm connection.

6. The assembly of claim 3, wherein the single torque arm assembly (i) is a single rigid torque connection between the skid assembly and the top assembly and (ii) includes a first torque arm and a second torque arm.

7. The assembly of claim 6, wherein the first torque arm and the second torque arm both extend between the forward torque arm connection and the rearward torque arm connection;
   wherein the forward torque arm connection is a single forward torque arm connection and the rearward torque arm connection is a single rearward torque arm connection.

8. The assembly of claim 6, wherein the skid assembly and the top assembly are both operable to rotate relative to the single torque arm assembly.

9. The assembly of claim 3, wherein the forward torque arm connection is fixed to the top assembly in a forward one-third position of a length of the skid assembly; and
   wherein the rearward torque arm connection is fixed to the skid assembly in a rearward two-third position of the length of the skid assembly.

10. The assembly of claim 1, wherein the shock assembly includes at least a first shock assembly and a second shock assembly.

11. The assembly of claim 10, wherein the suspension assembly further includes at least a forward suspension strap interconnecting a forward portion of the skid assembly with a forward portion of the top assembly.

12. The assembly of claim 7, wherein the suspension assembly including the shock assembly further includes a suspension strap;
    wherein the suspension strap limits rotation of the skid assembly relative to the top assembly.

13. The assembly of claim 1, further comprising:
    an engine; and
    rider controls;
       wherein the rider controls are configurable to operate the engine based on a rider input.

14. The assembly of claim 1, further comprising:
    a frame member suspension system connected between the vehicle frame member and the track chassis.

15. The assembly of claim 13, further comprising:
    a track moveable relative to the track chassis by power of the engine.

16. The assembly of claim 1, further comprising:
    the vehicle frame member.

17. The assembly of claim 1, further comprising:
    a ski assembly configured to be mounted to the vehicle frame member.

18. A method of providing a track chassis assembly operable to be connected to a vehicle frame member, wherein the vehicle frame member is configurable as a wheeled vehicle, comprising:
    providing a single torque arm assembly having a first end and a second end;
    configuring the first end of a single torque arm assembly to be connected to a skid assembly, wherein the connection of the first end is within a rearward one-third of a length of the skid assembly;
    configuring the second end of the single torque arm assembly to be connected to a top assembly, wherein the connection of the second end is within a forward one-third of a length of the skid assembly:
    configuring the single torque arm such that a first shock assembly is operable to be connected to both the skid assembly and the top assembly between the connection of the first end and the connection of the second end.

19. The method of claim 18, further comprising:
configuring the single torque arm such that a second shock assembly is operable to be spaced apart from the first shock assembly and connected between the connection of the first end and the connection of the second end.

20. The method of claim 18, further comprising:
providing a flexible member to be connected between the skid assembly and the top assembly;
wherein the first shock assembly is only a single shock assembly;
wherein the single torque arm assembly is the only rigid connection between the skid assembly and the top assembly.

21. The method of claim 20, wherein the flexible member between the skid assembly and the top assembly includes providing at least one end of the flexible member to be connected to the track chassis assembly outside of an area between the first end connection and the second end connection.

22. The method of claim 18, further comprising:
forming the single torque arm assembly of a rigid member.

23. The method of claim 18, further comprising:
forming the single torque arm assembly to include a first torque arm and a second torque arm.

* * * * *